United States Patent
Mishina et al.

(10) Patent No.: US 7,587,200 B2
(45) Date of Patent: Sep. 8, 2009

(54) COMPUTER SYSTEM AND BASE TRANSCEIVER STATIONS

(75) Inventors: Yusuke Mishina, Kunitachi (JP); Akiko Sato, Cupertino, CA (US); Masahiro Motobayashi, Tokyo (JP)

(73) Assignee: Hitachi, Ltd, Tokyo (JP)

( * ) Notice: Subject to any disclaimer, the term of this patent is extended or adjusted under 35 U.S.C. 154(b) by 631 days.

(21) Appl. No.: 11/488,601

(22) Filed: Jul. 19, 2006

(65) Prior Publication Data
US 2007/0027922 A1 Feb. 1, 2007

(30) Foreign Application Priority Data
Aug. 1, 2005 (JP) .............................. 2005-222645

(51) Int. Cl.
*H04W 4/00* (2009.01)
(52) U.S. Cl. ................. 455/422.1; 455/556.2; 455/561; 455/518; 370/328
(58) Field of Classification Search ............. 455/422.1, 455/423–425, 418–420, 517–520, 41.2, 550.1, 455/556.2, 560–561; 370/310, 328, 338; 707/104.1; 709/219.223; 340/7.46, 10.32
See application file for complete search history.

(56) References Cited

U.S. PATENT DOCUMENTS 7,496,383 B2 * 2/2009 Kurata et al. ................ 455/561
2005/0059391 A1 * 3/2005 Ikeda et al. ............... 455/426.2
2006/0105795 A1 * 5/2006 Cermak et al. .............. 455/518
2006/0149459 A1 * 7/2006 Matsuura et al. ............ 701/201
2006/0190458 A1 * 8/2006 Mishina et al. ............... 707/10
2007/0210916 A1 * 9/2007 Ogushi et al. ............... 340/531

FOREIGN PATENT DOCUMENTS

JP 2004-032176 6/2002
JP 2005202918 A * 7/2005

* cited by examiner

*Primary Examiner*—Kamran Afshar
(74) *Attorney, Agent, or Firm*—Stites & Harbison PLLC; Juan Carlos A. Marquez, Esq.

(57) ABSTRACT

A computer system including wireless terminals which transmit information, a business application server which performs a predetermined operation based on information received from the wireless terminals, and a base transceiver station which relays communications between the wireless terminals and the business application server, are provided. The base transceiver station, to manage said plural wireless terminals in groups, stores a group definition table showing a correspondence between the wireless terminals and the groups, stores the information received from the terminals in a state history table which manages the state history of the wireless terminals, extracts difference information between the information received from the wireless terminals and the information stored in the state history table, summarizes the extracted difference information for each group, and transmits it to the business application server. The data amount received by a business application server is thus reduced.

11 Claims, 15 Drawing Sheets

FIG. 2

GROUP STATE TRANSITION RULE TABLE 310

| RULE NUMBER 3101 | PRE-TRANSITION RULE NUMBER 3102 | GROUP NUMBER 3103 | LOCATION INFORMATION 3104 | GROUP LOCATION POSITION 3105 |
|---|---|---|---|---|
| R0 (INITIAL STATE) | — | G1 | NOT PRESENT | — |
| R1 | {R0, R1} | G1 | PRESENT | BASE STATION A |
| R2 | {R1, R2} | G1 | PRESENT | BASE STATION B |
| R3 | {R1, R2} | G1 | NOT PRESENT | — |

FIG. 3

GROUP STATE HISTORY TABLE 320

| GROUP NUMBER 3201 | RECEIVING TIME 3202 | GROUP LOCATION POSITION 3203 | RULE NUMBER 3204 |
|---|---|---|---|
| G1 | T0 | — | R0 |
| G1 | T3 | BASE STATION A | R1 |
| G1 | T13 | BASE STATION A | R1 |
| G1 | T23 | BASE STATION B | R2 |
| G1 | T33 | BASE STATION B | R2 |

FIG. 4A

| GROUP NUMBER (3301) | NODE NUMBER (3302) | MEASUREMENT TIME (3303) |
|---|---|---|
| G1 | A | T0 |
| G1 | B | T0 |

GROUP DEFINITION TABLE (T0) — 330

FIG. 4B

| GROUP NUMBER (3301) | NODE NUMBER (3302) | MEASUREMENT TIME (3303) |
|---|---|---|
| G1 | A | T2 |
| G1 | B | T2 |

GROUP DEFINITION TABLE (T3) — 330

FIG. 4C

| GROUP NUMBER (3301) | NODE NUMBER (3302) | MEASUREMENT TIME (3303) |
|---|---|---|
| G1 | A | T12 |
| G1 | B | T12 |

GROUP DEFINITION TABLE (T13) — 330

FIG. 4D

| GROUP NUMBER (3301) | NODE NUMBER (3302) | MEASUREMENT TIME (3303) |
|---|---|---|
| G1 | A | T22 |
| G1 | B | T22 |

GROUP DEFINITION TABLE (T23) — 330

FIG. 4E

| GROUP NUMBER (3301) | NODE NUMBER (3302) | MEASUREMENT TIME (3303) |
|---|---|---|
| G1 | A | T31 |

GROUP DEFINITION TABLE (T33) — 330

FIG. 5A

| RULE NUMBER 2101 | PRE-TRANSITION RULE NUMBER 2102 | NODE NUMBER 2103 | LOCATION INFORMATION 2104 | NODE LOCATION POSITION 2105 |
|---|---|---|---|---|
| R0 (INITIAL STATE) | R0 | {A, B} | NOT PRESENT | - 2111 |
| R1 | {R0, R1} | {A, B} | PRESENT | BASE STATION A 2112 |
| R3 | R1 | {A, B} | NOT PRESENT | - 2113 |

NODE STATE TRANSITION RULE TABLE OF BASE STATION A ~210

FIG. 5B

| RULE NUMBER 2101 | PRE-TRANSITION RULE NUMBER 2102 | NODE NUMBER 2103 | LOCATION INFORMATION 2104 | NODE LOCATION POSITION 2105 |
|---|---|---|---|---|
| R0 (INITIAL STATE) | R0 | {A, B} | NOT PRESENT | - 2114 |
| R2 | {R0, R2} | {A, B} | PRESENT | BASE STATION B 2115 |
| R3 | R2 | {A, B} | NOT PRESENT | - 2116 |

NODE STATE TRANSITION RULE TABLE OF BASE STATION B ~210

FIG. 6A

| GROUP NUMBER | NODE NUMBER | MEASUREMENT TIME | RULE NUMBER | |
|---|---|---|---|---|
| G1 | A | T0 | R0 | 2211 |
| G1 | B | T0 | R0 | 2212 |
| G1 | A | T1 | R1 | 2213 |
| G1 | B | T2 | R1 | 2214 |
| G1 | A | T11 | R1 | 2215 |
| G1 | B | T12 | R1 | 2216 |
| G1 | A | T21 | R3 | 2217 |
| G1 | B | T21 | R3 | 2218 |
| G1 | A | T31 | R3 | 2219 |
| G1 | B | T31 | R3 | 2220 |

NODE STATE HISTORY TABLE OF BASE STATION A

FIG. 6B

| GROUP NUMBER | NODE NUMBER | MEASUREMENT TIME | RULE NUMBER | |
|---|---|---|---|---|
| G1 | A | T0 | R0 | 2231 |
| G1 | B | T0 | R0 | 2232 |
| G1 | A | T1 | R0 | 2233 |
| G1 | B | T2 | R0 | 2234 |
| G1 | A | T11 | R0 | 2235 |
| G1 | B | T12 | R0 | 2236 |
| G1 | A | T21 | R2 | 2237 |
| G1 | B | T22 | R2 | 2238 |
| G1 | A | T31 | R2 | 2239 |
| G1 | B | T31 | R3 | 2240 |

NODE STATE HISTORY TABLE OF BASE STATION B

FIG. 7A

| GROUP NUMBER | NODE NUMBER | MEASUREMENT TIME |
|---|---|---|
| G1 | A | T0 |
| G1 | B | T0 |

GROUP DEFINITION TABLE (T0) OF BASE STATION A

FIG. 7B

| GROUP NUMBER | NODE NUMBER | MEASUREMENT TIME |
|---|---|---|
| G1 | A | T1 |
| G1 | B | T2 |

GROUP DEFINITION TABLE (T3) OF BASE STATION A

FIG. 7C

| GROUP NUMBER | NODE NUMBER | MEASUREMENT TIME |
|---|---|---|
| G1 | A | T11 |
| G1 | B | T12 |

GROUP DEFINITION TABLE (T13) OF BASE STATION A

FIG. 7D

| GROUP NUMBER (2301) | NODE NUMBER (2302) | MEASUREMENT TIME (2303) |
|---|---|---|
| G1 | A | T0 |
| G1 | B | T0 |

GROUP DEFINITION TABLE (T23) OF BASE STATION B (230)

| GROUP NUMBER (2301) | NODE NUMBER (2302) | MEASUREMENT TIME (2303) |
|---|---|---|
| G1 | A | T21 |
| G1 | B | T22 |

GROUP DEFINITION TABLE (T33) OF BASE STATION B (230)

| GROUP NUMBER (2301) | NODE NUMBER (2302) | MEASUREMENT TIME (2303) |
|---|---|---|
| G1 | A | T31 |

GROUP DEFINITION TABLE (T33) OF BASE STATION B (230)

| GROUP NUMBER 3301 | NODE NUMBER 3302 | MEASUREMENT TIME 3303 | MEASUREMENT TEMPERATURE 3304 |
|---|---|---|---|
| G1 | A | T0 | - |
| G1 | B | T0 | - |

GROUP DEFINITION TABLE (T0) 330

FIG. 12B

| GROUP NUMBER 3301 | NODE NUMBER 3302 | MEASUREMENT TIME 3303 | MEASUREMENT TEMPERATURE 3304 |
|---|---|---|---|
| G1 | A | T2 | 6°C |
| G1 | B | T2 | 4°C |

GROUP DEFINITION TABLE (T3) 330

FIG. 12C

| GROUP NUMBER 3301 | NODE NUMBER 3302 | MEASUREMENT TIME 3303 | MEASUREMENT TEMPERATURE 3304 |
|---|---|---|---|
| G1 | A | T12 | 11°C |
| G1 | B | T12 | 4°C |

GROUP DEFINITION TABLE (T13) 330

FIG. 12D

| GROUP NUMBER (3301) | NODE NUMBER (3302) | MEASUREMENT TIME (3303) | MEASUREMENT TEMPERATURE (3304) |
|---|---|---|---|
| G1 | A | T22 | 12°C |
| G1 | B | T22 | 4°C |

GROUP DEFINITION TABLE (T23)  330

FIG. 12E

| GROUP NUMBER (3301) | NODE NUMBER (3302) | MEASUREMENT TIME (3303) | MEASUREMENT TEMPERATURE (3304) |
|---|---|---|---|
| G1 | A | T31 | 12°C |

GROUP DEFINITION TABLE (T33)  330

FIG. 13A

NODE STATE HISTORY TABLE OF BASE STATION A — 220

| GROUP NUMBER (2201) | NODE NUMBER (2202) | MEASUREMENT TIME (2203) | RULE NUMBER (2204) | MEASUREMENT TEMPERATURE (2205) | |
|---|---|---|---|---|---|
| G1 | A | T0 | R0 | - | 2251 |
| G1 | B | T0 | R0 | - | 2252 |
| G1 | A | T1 | R1 | 6°C | 2253 |
| G1 | B | T2 | R1 | 4°C | 2254 |
| G1 | A | T11 | R1 | 11°C | 2255 |
| G1 | B | T12 | R1 | 4°C | 2256 |
| G1 | A | T21 | R3 | - | 2257 |
| G1 | B | T21 | R3 | - | 2258 |
| G1 | A | T31 | R3 | - | 2259 |
| G1 | B | T31 | R3 | - | 2260 |

FIG. 13B

NODE STATE HISTORY TABLE OF BASE STATION B — 220

| GROUP NUMBER (2201) | NODE NUMBER (2202) | MEASUREMENT TIME (2203) | RULE NUMBER (2204) | MEASUREMENT TEMPERATURE (2205) | |
|---|---|---|---|---|---|
| G1 | A | T0 | R0 | - | 2261 |
| G1 | B | T0 | R0 | - | 2262 |
| G1 | A | T1 | R0 | - | 2263 |
| G1 | B | T2 | R0 | - | 2264 |
| G1 | A | T11 | R0 | - | 2265 |
| G1 | B | T12 | R0 | - | 2266 |
| G1 | A | T21 | R2 | 12°C | 2267 |
| G1 | B | T21 | R2 | 4°C | 2268 |
| G1 | A | T31 | R2 | 12°C | 2269 |
| G1 | B | T31 | R3 | - | 2270 |

# COMPUTER SYSTEM AND BASE TRANSCEIVER STATIONS

CLAIM OF PRIORITY

The present application claims priority from Japanese Application JP 2005-22645 filed on Aug. 1, 2005, the content of which is hereby incorporated by reference into this application.

FIELD OF THE INVENTION

The present invention relates to a computer system comprising wireless terminals, base transceiver stations and a business application server, and in particular to a technique of reducing the data communication amount between these devices.

BACKGROUND OF THE INVENTION

A ubiquitous information society, which provides optimal data services according to the state or environment of things, is now becoming a reality. The use of ubiquitous information processing devices using IC chips such as smart cards or radio frequency tags (RFID) is also becoming more widespread. Trials of these devices in applied services like electronic banking, physical distribution management, security management or information services are now under way.

In recent years, sensor network systems consisting of a sensor node, a base station and a business application server have been developed. The sensor node is attached to a man or an object, and is provided with a sensor which measures the state of the man or object. The business application server acquires information measured by the sensor node, and performs business application service procedures based on the acquired information. The base station relays communication between the sensor node and business application server.

A conventional radio tag transmits only individual identification information. On the other hand, sensor nodes can transmit the state of the man or object, so they are expected to find applications in advanced business application services.

A sensor node cannot perform its tasks independently, but needs to cooperate with a task program on the business application server. The business application server receives required information from many sensor nodes, and implements business application services based on the received information. The business application server must therefore process the information received from many sensor nodes efficiently.

Whenever the business application server of a conventional sensor network system measures each sensor node, it performs communication with the base station, database search, database storage and database commitment. Hence, if the number of sensor nodes to be measured increases, the data processing amount of the business application server will increase dramatically.

A sensor network system which reduces the data amount transmitted by the sensor node is known (e.g., JP-A No. 2004-32176). When transmitting plural numerical data, the sensor node in this sensor network system extracts master data therefrom. Next, the difference value of the extracted master data and each numerical data is calculated, and the calculated difference value is transmitted to the business application server. In this way, the data amount received by the business application server can be reduced.

SUMMARY OF THE INVENTION

However, in the sensor network system described in JP-A No. 2004-32176, if the sensor node transmits only the node number to the business application server, the data amount received by the business application server cannot be reduced. Also, the number of times data must be stored in the database cannot be reduced.

It is therefore an object of the invention, which was conceived in view of the aforesaid problem, to provide a sensor network system which reduces the data amount received by the business application server.

This object is attained by a computer system comprising wireless terminals which transmit information, a business application server which performs a predetermined operation based on information received from said wireless terminals, and a base transceiver station which relays communications between said wireless terminals and said business application server, wherein said base transceiver station, to manage said plural wireless terminals in groups, stores a group definition table showing a correspondence between said wireless terminals and said groups, stores information received from said terminals in a state history table which manages the state history of said wireless terminals, extracts difference information between the information received from said wireless terminals and the information stored in said state history table, summarizes said extracted difference information for each group and transmits it to the business application server.

According to the invention, the data amount received by the business application server can be reduced.

BRIEF DESCRIPTION OF THE DRAWINGS

FIG. 2 is a schematic diagram of a group state transition rule table of a business application server according to the first embodiment of the invention;

FIG. 3 is a schematic diagram of a group state history table of the business application server according to the first embodiment of the invention;

FIG. 4A is a schematic diagram of a group definition table of the business application server at a time T0 according to the first embodiment of the invention;

FIG. 4B is a schematic diagram of the group definition table of the business application server at a time T3 according to the first embodiment of the invention;

FIG. 4C is a schematic diagram of the group definition table of the business application server at the time T13 according to the first embodiment of the invention;

FIG. 4D is a schematic diagram of the group definition table of the business application server at the time T23 according to the first embodiment of the invention;

FIG. 4E is a schematic diagram of the group definition table of the business application server at the time T33 according to the first embodiment of the invention;

FIG. 5A is a schematic diagram of a node state transition rule table of a base transceiver station A according to the first embodiment of the invention;

FIG. 5B is a schematic diagram of a node state transition rule table of a base transceiver station B according to the first embodiment of the invention;

FIG. 6A is a schematic diagram of a node state history table of the base transceiver station A according to the first embodiment of the invention;

FIG. 6B is a schematic diagram of a node state history table of the base transceiver station B according to the first embodiment of the invention;

FIG. 7A is a schematic diagram of the group definition table of the base transceiver station A at the time T0 according to the first embodiment of the invention;

FIG. 7B is a schematic diagram of the group definition table of the base transceiver station A at the time T3 according to the first embodiment of the invention;

FIG. 7C is a schematic diagram of the group definition table of the base transceiver station A at the time T13 according to the first embodiment of the invention;

FIG. 7D is a schematic diagram of the group definition table of the base transceiver station B at the time T0 according to the first embodiment of the invention;

FIG. 7E is a schematic diagram of the group definition table of the base transceiver station B at the time T23 according to the first embodiment of the invention;

FIG. 7F is a schematic diagram of the group definition table of the base transceiver station B at the time T33 according to the first embodiment of the invention;

FIG. 12A is a schematic diagram of the group definition table of the business application server at the time T0 according to a second embodiment of the invention;

FIG. 12B is a schematic diagram of the group definition table of the business application server at the time T3 according to the second embodiment of the invention;

FIG. 12C is a schematic diagram of the group definition table of the business application server at the time T13 according to the second embodiment of the invention;

FIG. 12D is a schematic diagram of the group definition table of the business application server at the time T23 according to the second embodiment of the invention;

FIG. 12E is a schematic diagram of the group definition table of the business application server at the time T33 according to the second embodiment of the invention;

FIG. 13A is a schematic diagram of the node state history table of the base transceiver station A according to the second embodiment of the invention;

FIG. 13B is a schematic diagram of the node state history table 220 of the base transceiver station B according to the second embodiment of the invention.

DETAILED DESCRIPTION OF THE PREFERRED EMBODIMENTS

Figure 1:
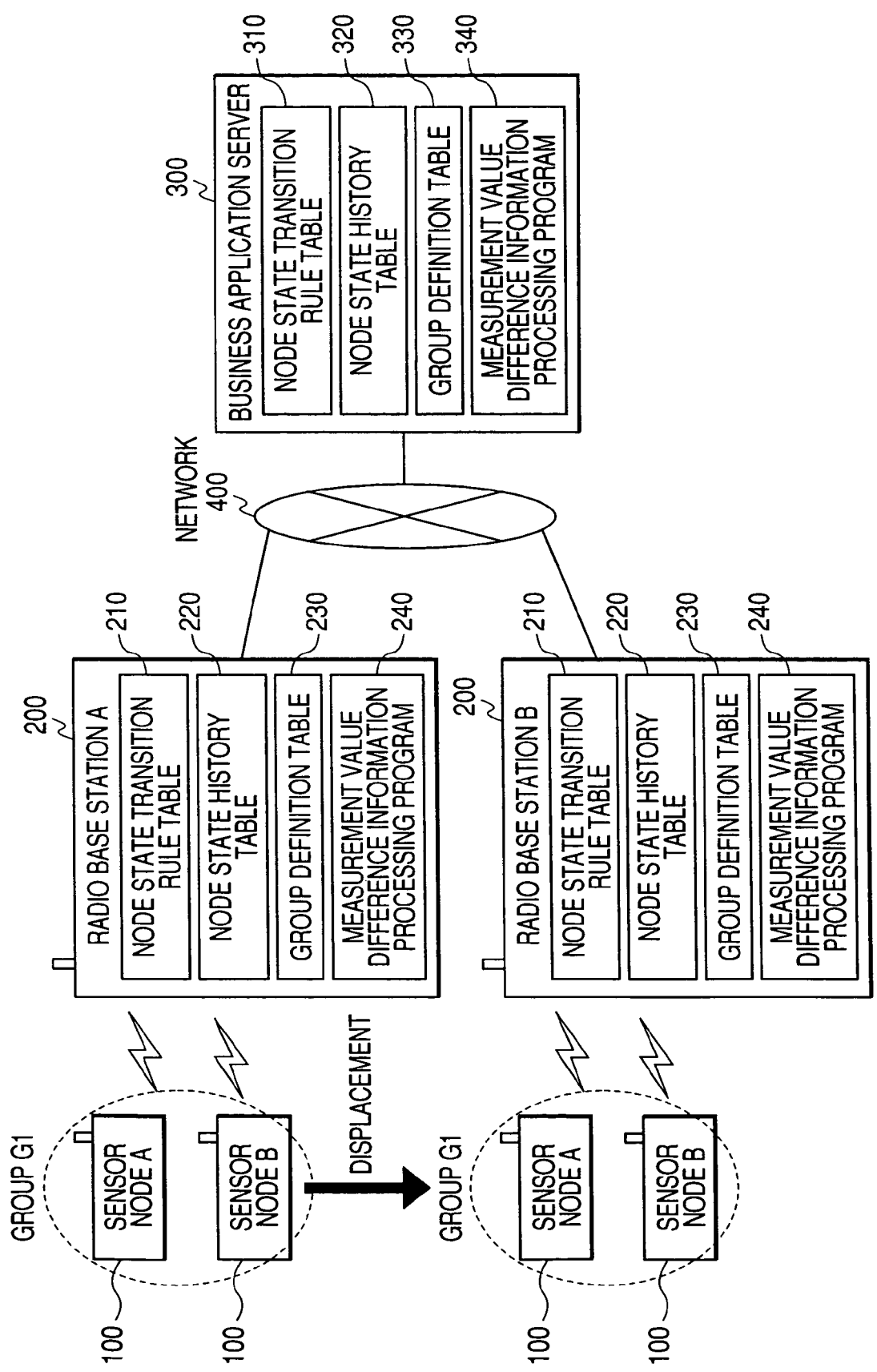
FIG. 1 is a block diagram of a sensor network system according to a first embodiment of the invention.

One embodiment of the invention will now be described referring to the drawings.

Embodiment 1

FIG. 1 is a block diagram of a sensor network system according to a first embodiment of the invention.

The sensor network system comprises a sensor node 100, base transceiver station 200, business application server 300 and network 400.

The sensor node 100 is an information processing terminal provided with a built-in sensor and wireless communications unit. The built-in sensor measures physical information. The wireless communications unit performs wireless communications with the base transceiver station 200.

The sensor node 100 measures various physical information using the built-in sensor, and the measured physical information (sensor data) is transmitted to the base transceiver station 200.

When a response request is received from the base transceiver station 200, the sensor node 100 of this embodiment transmits sensor data to the base transceiver station 200. The sensor node 100 may transmit the sensor data to the base transceiver station 200 with a predetermined timing.

The base transceiver station 200 comprises a wireless communications unit, network communications unit and data conversion processing unit. The wireless communications unit performs wireless communications with the sensor node 100. The network communication unit communicates with the business application server 300 via the network 400. The data conversion processing unit interchanges the communications protocol of the wireless communications unit with the communications protocol of the network communication unit.

The base transceiver station 200 receives the sensor data from the sensor node 100. Next, protocol conversion of the received sensor data is performed, and the sensor data for which protocol conversion was performed is transmitted to the business application server 300 via the network 400.

The base transceiver station 200 has a node state transition rule table 210, node state history table 220, group definition table 230 and measurement value difference information processing program 240.

The node state transition rule table 210, which is described later in FIGS. 5A, 5B, manages the transition rules of the state of the sensor node 100. In this embodiment, the state of the sensor node 100 is the position of the sensor node 100. The state transition rule is a rule concerning the displacement sequence of the sensor node 100.

The node state history table 220, which is described later in FIGS. 6A, 6B, manages the state history of the sensor node 100.

The group definition table 230, which is described later in FIGS. 7A-7F, manages the group to which the sensor node 100 belongs.

The measurement value difference information processing program 240 updates the group definition table 230. The measurement value difference information processing program 240 also requests difference information relating to the sensor data received from the sensor node 100, and transmits it to the business application server 300. In this embodiment, difference information is difference information relating to the sensor node 100 which forms part of a group.

The network 400 connects the base transceiver station 200 with the business application server 300. The network 400 is, for example, a local area network (LAN) or a wide area network (WAN).

The business application server 300 is a computer which executes a business application. The business application is a program which performs a business application. The business application of this embodiment manages a business process or the like. Specifically, the business application manages a position trace data of the object to which the sensor node 100 is attached.

The business application server 300 manages the sensor nodes 100 in group units. In this embodiment, the business application server 300 manages a sensor node A100 and sensor node B100 as a group G1. The sensor nodes 100 may be divided into groups for example according to the business process flow. The sensor nodes 100 relating to identical tasks may be assigned to identical groups.

The business application server 300 also has a group state transition rule table 310, group state history table 320, group definition table 330 and a measurement value difference information processing program 340.

The group state transition rule table 310, which is described later in FIG. 2, manages group state transition rules.

The group state history table 320, which is described later in FIG. 3, manages group state history.

The group definition table 330, which is described later in FIGS. 4A-4E, manages the group to which the sensor node 100 belongs.

The measurement value difference information processing program 340 updates the group state group definition tables 320, 330 based on the difference information received from the base transceiver station 200.

The sensor network system of this embodiment is preferably used for product manufacture or distribution. In this case, the sensor node 100 is attached to the product. The sensor node 100 measures the state of the product to which it is attached with a constant interval. The state of the product is, for example, the position of the product, the temperature or the magnitude of a physical collision. The sensor node 100 transmits the state of the measured product to the business application server 300 via the base transceiver station 200.

The business application server 300 then receives the state of the product from the sensor node 100, and the business application server 300 processes the state of the received product by executing the tasking application. The business application performs for example production control or inventory management.

Hence, the sensor network system of this embodiment, when used for product manufacture or distribution, can achieve an improvement in productivity and distribution efficiency.

In the business process of this embodiment, the sensor node A100 and the sensor node B100 belonging to a group G1 move from inside the communication range of the base transceiver station A200 into the communication range of the base transceiver station B200.

FIG. 2 is a schematic diagram of the group state transition rule table 310 of the business application server 300 according to the first embodiment of the invention.

The group state transition rule table 310 includes a rule number 3101, pre-transition rule number 3102, group number 3103, presence information 3104 and group location position 3105.

The rule number 3101 is a unique identifier of the state transition rule. The pre-transition rule number 3102 is a unique identifier of the immediately preceding state transition rule.

The group number 3103 is a unique identifier of the group to which the state transition rule can be applied.

The presence information 3104 shows whether or not this group is present within any of the communication ranges of the base transceiver station 200.

The group location position 3105 shows the position of this group. Specifically, a unique identifier of the base transceiver station 200 which can communicate with this group is stored in the group location position 3105. When the presence information 3104 is "not present", no value is stored in the group location position 3105.

In the group state transition rule table 310, state transition rules are defined based on the business process.

In the business process of this embodiment, the group G1 starts displacing from a position which is not in the communication range of the base transceiver station 200 (record 3111). Next, the group G1 moves into the communication range of the base transceiver station A200 (record 3112). Next, the group G1 moves into the communication range of the base transceiver station B200 (record 3113). The group G1 then moves to a position which is not in any of the communication ranges of the base transceiver stations 200 (record 3114), and the business process is terminated.

The group state transition rule table 310 is set up by the administration user.

FIG. 3 is a schematic diagram of the group state history table 320 of the business application server 300 according to the first embodiment of the invention.

The group state history table 320 contains a group number 3201, receiving time 3202, group location position 3203 and rule number 3204.

The group number 3201 is a unique group identifier. The receiving time 3202 is the time when the business application server 300 received the information for this group.

The group location position 3203 shows the position of this group. Specifically, a unique identifier of the base transceiver station 200 which communicated with this group is stored in the group location position 3203.

The rule number 3204 is a unique identifier of the state transition rule to which this group corresponds at this time.

FIG. 4A is a schematic diagram of the group definition table 330 of the business application server 300 at a time T0 according to the first embodiment of the invention.

FIG. 4B is a schematic diagram of the group definition table 330 of the business application server 300 at a time T3 according to the first embodiment of the invention.

FIG. 4C is a schematic diagram of the group definition table 330 of the business application server 300 at a time T13 according to the first embodiment of the invention.

FIG. 4D is a schematic diagram of the group definition table 330 of the business application server 300 at a time T23 according to the first embodiment of the invention.

FIG. 4E is a schematic diagram of the group definition table 330 of the business application server 300 at a time T33 according to the first embodiment of the invention.

The group definition table 330 contains a group number 3301, node number 3302 and measurement time 3303.

The group number 3301 is a unique group identifier. The node number 3302 is a unique identifier of the sensor node 100 belonging to this group.

The measurement time 3303 is the time when the base transceiver station 200 measured this group.

FIG. 5A is a schematic diagram of the node state transition rule table 210 of the base transceiver station A200 according to the first embodiment of the invention. FIG. 5B is a schematic diagram of the node state transition rule table 210 of the base transceiver station B200 according to the first embodiment of the invention.

The node state transition rule table 210 includes a rule number 2101, pre-transition rule number 2102, node number 2103, presence information 2104 and node location position 2105.

The rule number 2101 is a unique state transition rule identifier. The rule number 2102 is a unique identifier of the immediately preceding state transition rule.

The group number 2103 is a unique identifier of the sensor node 100 to which this state transition rule can be applied.

The presence information 2104 shows whether or not this sensor node 100 is present in any of the communication ranges of the base transceiver station 200.

The node location position 2105 shows the position of this sensor node 100. Specifically, a unique identifier of the base transceiver station 200 which can communicate with this sensor node is stored in the group location position 2105. When the presence information 2104 is "not present", no value is stored in the node location position 3105.

FIG. 6A is a schematic diagram of the node state history table 220 of the base transceiver station A200 according to the first embodiment of the invention. FIG. 6B is a schematic diagram of the node state history table 220 of the base transceiver station B200 according to the first embodiment of the invention.

The node state history table 220 contains a group number 2201, node number 2202, measurement time 2203 and rule number 2204.

The group number 2201 is a unique group identifier. The node number 2202 is a unique identifier of the sensor node 100 belonging to this group.

The measurement time 2203 is the time when the base transceiver station 200 measured this sensor node 100.

The rule number 2204 is a unique identifier of the state transition rule to which this sensor node 100 corresponds at this time.

FIG. 7A is a schematic diagram of the group definition table 230 of the base transceiver station A200 at the time T0 according to the first embodiment of the invention.

FIG. 7B is a schematic diagram of the group definition table 230 of the base transceiver station A200 at the time T3 according to the first embodiment of the invention.

FIG. 7C is a schematic diagram of the group definition table 230 of the base transceiver station A200 at the time T13 according to the first embodiment of the invention.

FIG. 7D is a schematic diagram of the group definition table 230 of the base transceiver station B200 at the time T0 according to the first embodiment of the invention.

FIG. 7E is a schematic diagram of the group definition table 230 of the base transceiver station B200 at the time T23 according to the first embodiment of the invention.

FIG. 7F is a schematic diagram of the group definition table 230 of the base transceiver station B200 at the time T33 according to the first embodiment of the invention.

The group definition table 230 contains a group number 2301, node number 2302 and measurement time 2303.

The group number 2301 is a unique group identifier. The node number 2302 is a unique identifier of the sensor node 100 belonging to this group.

The measurement time 2303 is the time when the base transceiver station 200 measured this sensor node 100.

Figure 8:
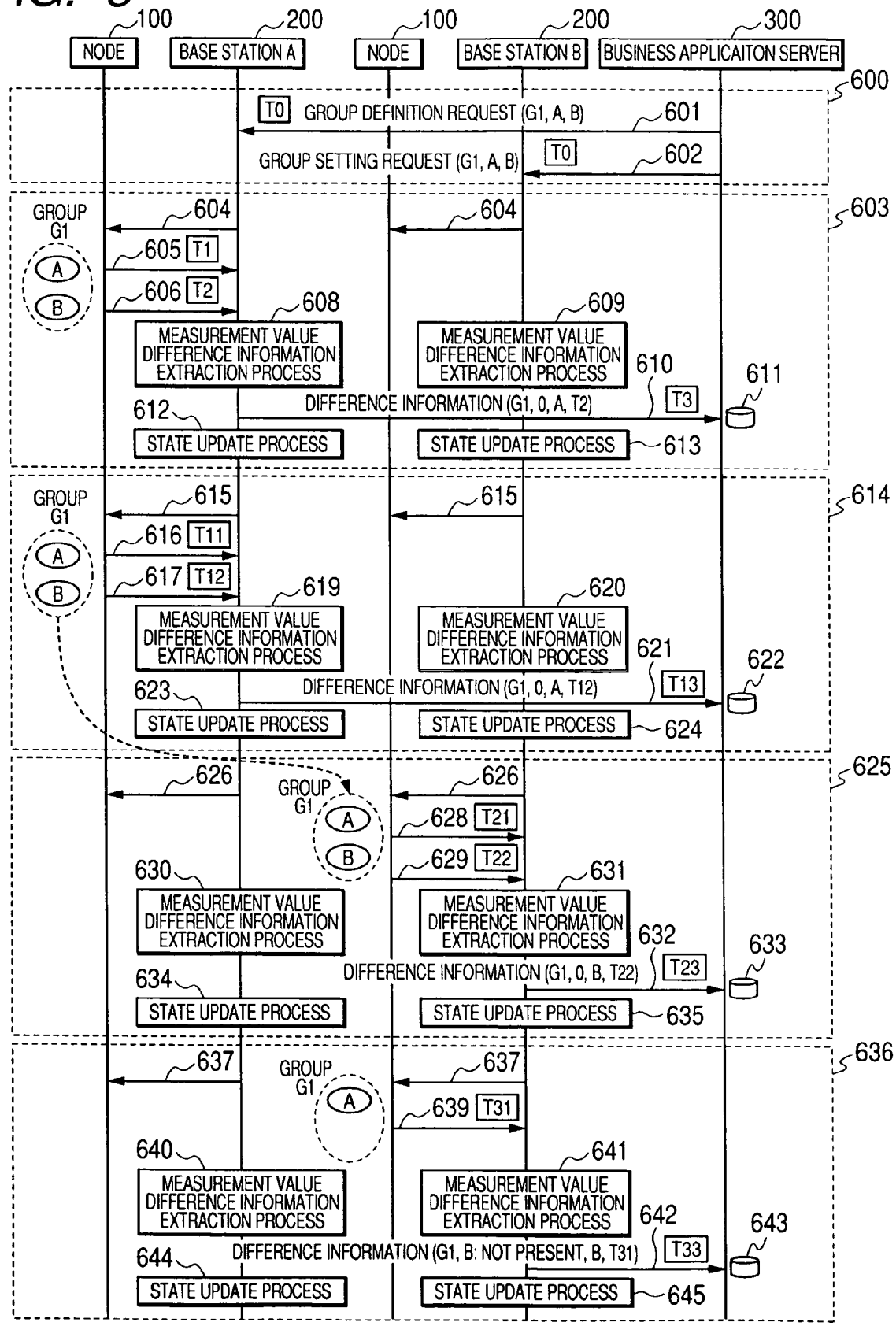
FIG. 8 is a sequence chart of the processing of the sensor network system according to the first embodiment of the invention.

FIG. 8 is a sequence chart of the processing of the sensor network system according to the first embodiment of the invention.

In this chart, the group G1 including the sensor node A100 and sensor node B100 moves from the communication range of the base transceiver station A200 to the communication range of the base transceiver station B200. The sensor node B100 then leaves the group G1.

First, the sensor network system, at the time T0, performs initialization processing (600).

Specifically, referring to the group definition table 330 (FIG. 4A), the business application server 300 creates a group setting request. For example, the business application server 300 extracts "G1" of the group number 3301 and "A", "B" of the node number 3302 from the group definition table 330 (FIG. 4A). The group setting request including the extracted group number 3301 and node number 3302 is then created.

Next, the business application server 300 transmits the created group setting request to all the base transceiver stations 200. Here, the group setting request is transmitted to the base transceiver station A200 and base transceiver station B200 (601, 602).

The base transceiver station A200 receives the group setting request, and based on the group setting request which was received, the group definition table 230 (FIG. 7A) is created.

Specifically, "G1" of the group number 3301 and "A", "B" Of the node number 3302 are extracted from the group setting request which was received. Next, the extracted "G1" of the group number 3301 is stored in the group number 2301 of the group definition table 230. Next, the extracted "A", "B" of the node number 3302 are stored in the node number 2302 of the group definition table 230. Next, the time at which the group setting request was received is stored in the measurement time 2303 of the group definition table 230.

In this way, the base transceiver station A200 creates the group definition table 230 (FIG. 7A). According to this group definition table 230, the group G1 comprises the sensor node A100 and sensor node B100 (record 2311 and record 2312).

Likewise, the base transceiver station B200 creates a group definition table (FIG. 7D) based on the group setting request which was received. According to this group definition table 230, the group G1 comprises the sensor node A100 and sensor node B100 (record 2321 and record 2322).

Next, the business application server 300 initializes the node state transition rule table 210 of the base transceiver station 200.

Specifically, the group state transition rule table 310 (FIG. 2) is transmitted to all the base transceiver stations 200. The group state transition rule table 310 may be transmitted together with the group setting request.

The base transceiver station A200 receives the group state transition rule table 310. Based on the received group transition rule table 310, the node state transition rule table 210 (FIG. 5A) is then created.

Specifically, the base transceiver station A200 extracts the record 3112 for which the group location position 3105 of the group state transition rule table 310 coincides with its identifier, from the group state transition rule table 310. Next, the records 3111, 3114 for which a value is not stored in the group location position 3105 of the received group state transition rule table 310, are extracted from the group state transition rule table 310.

Next, the information of the extracted record 3111 is stored in a record 2111 of the node state transition rule table 210. The information of the extracted record 3112 is stored in a record 2112 of the node state transition rule table 210. The information of the extracted record 3114 is stored in a record 2113 of the node state transition rule table 210.

In this way, the base transceiver station A200 creates the node state transition rule table 210 (FIG. 5A).

Likewise, the base transceiver station B200 creates the node state transition rule table 210 (FIG. 5B) based on the received group transition rules table 310.

Specifically, the base transceiver station B200 extracts the record 3113 for which the group location position 3105 of the group state transition rule table 310 coincides with its identifier, from the group state transition rule table 310. Next, the records 3111, 3114 for which a value is not stored in the group location position 3105 of the received group state transition rule table 310, are extracted from the group state transition rule table 310.

Next, the information of the extracted record 3111 is stored in a record 2114 of the node state transition rule table 210. The information of the extracted record 3113 is stored in a record 2115 of the node state transition rule table 210. The information of the extracted record 3114 is stored in a record 2116 of the node state transition rule table 210.

In this way, the base transceiver station B200 creates the node state transition rule table 210 (FIG. 5B).

Next, the business application server 300 initializes the node state history table 220 of the base transceiver station 200.

Specifically, information relating to the record 3211 of the group state history table 320 is transmitted to all the base transceiver stations 200. This information may be transmitted together with a group setting request.

The base transceiver station A200 receives the information relating to the record 3211 of the group state history table 320. Based on the received information, the node state history table 220 (FIG. 6A) is created.

Specifically, the base transceiver station A200 stores the group number 3201 of the received group state history table 320 in the group number 2201 of the node state history table 220.

Next, all the records for which the group numbers 3201 of the received group state history table 320 coincide with group numbers 2301 of the group definition table 230 (FIG. 7A), are selected from the group definition table 230. Next, the node number 2302 is extracted from the selected records. Next, the extracted node number 2302 is stored in the node number 2202 of the node state history table 220.

Next, the time at which the information relating to the group state history table 320 was received, is stored in the measurement time 2203 of the node state history table 220. Next, the rule number 3204 of the received group state history table 320 is stored in the rule number 2204 of the node state history table 220.

In this way, the base transceiver station A200 creates records 2211, 2212 of the node state history table 220 (FIG. 6A) from the record 3211 of the group state history table 320.

Likewise, the base transceiver station B200 creates records 2231, 2232 of the node state history table 220 (FIG. 6B) from the record 3211 of the group state history table 320.

After ending initialization processing, the sensor network system performs first node measurement processing (603).

Assume that at this time, the group G1 including the sensor node A100 and the sensor node B100 has moved into the communication range of the base station A200.

First, the base station 200 transmits a response request in its communication range (604). The sensor node 100 which is present in the communication range of the base transceiver station 200 then receives the response request.

Here, the sensor node A100 and the sensor node B100 receive the response request from the base transceiver station A200.

The sensor node A100, at a time T1, then transmits sensor data including its node number to the base transceiver station A200 (605). Likewise, at a time T2, the sensor node B100 transmits sensor data including its node number to the base transceiver station A200 (606).

The base transceiver station A200 receives sensor data from the sensor node A100 and the sensor node B100.

Next, the base transceiver station A200 performs measurement value difference information extraction processing by comparing the received sensor data with the node state history table 220 (608). The difference extracted by this processing is a difference relating to the presence of the sensor node 100 belonging to the group.

Specifically, the base transceiver station A200 extracts "A" and "B" of the node number 2302 from the group definition table 230 (FIG. 7A). Next, a difference of "0" is calculated by comparing the extracted node number 2302 with the node number in the received sensor data.

The base transceiver station A200 transmits the difference information including the difference of "0" which was calculated to the business application server 300 at the time T3 (610). The difference information includes the group number "G1", the identifier "base station A" of the base transceiver station A200 and the measurement time "T2".

The business application server 300 receives the difference information from the base transceiver station A200. Next, based on the received difference information, the group state history group definition tables 320 and 330 are updated (611).

Specifically, the record for which the group number "G1" in the received difference information coincides with the group number 3201 of the group state history table 320, is selected from the group state history table 320. Next, the record 3211 for the latest receiving time 3202 is selected from the selected records. Next, "R0" of the rule number 3204 is extracted from the selected record 3211.

Next, the record for which "R0" of the extracted rule number 3204 is included in the pre-transition rule number 3102 of the group state transition rule table 310, is selected from the group state transition rule 310 table.

Next, the record for which the group number "G1" in the received difference information coincides with the group number 3103 of the group state transition rule table 310, is selected from the selected records. Next, the record for which the identifier of the base transceiver station 200 in the received difference information coincides with the group location position 3105 of the group state transition rule table 310, is selected from the selected records.

Here, the business application server 300 selects the record 3112 from the group state transition rule table 310.

Next, "R1" of the rule number 3101 is extracted from the selected record 3112.

Next, a new record 3212 is created in the group state history table 320. Next, "R1" of the extracted rule number 3101 is stored in the rule number 3204 of the new record 3212.

Next, the group number "G1" in the received difference information is stored in the group number 3201 of the new record 3212. Next, a time "T3" at which difference information was received, is stored in a receiving time 3202 of the new record 3212. Next, the identifier of the base transceiver station A200 in the received difference information is stored in the group location position 3203 of the new record 3212.

Next, the business application server 300 updates the group definition table 330.

Specifically, since the difference in the difference information is "0", only the measurement time 3303 of the group definition table 330 is updated.

The business application server 300 stores the measurement time "T2" in the received difference information, in the measurement time 3303 of the group definition table 330.

Thereby, the business application server 300 converts the group definition table 330 shown in FIG. 4A to the group definition table 330 shown in FIG. 4B.

When the group state history group definition tables 320, 330 are updated, the business application server 300 transmits a difference information receipt acknowledgment to the base transceiver station A200.

On the other hand, when the base transceiver station A200 transmits difference information to the business application server, state update processing is performed (612). Specifically, the base transceiver station A200 updates the node state history group definition tables 220, 230.

First, update of the node state history table 220 will be described.

The base transceiver station A200 extracts records 2211, 2212 from the node state history table 220.

Next, the base transceiver station A200 adds information relating to the sensor node A100 to the node state history table 220. For this purpose, "R0" of the rule number 2204 is extracted from the extracted record 2211.

Next, the base transceiver station A200 selects the record for which "R0" of the extracted rule number 2204 is included in the pre-transition rule number 2102 of the node state transition rule table 210, from the node state transition rule table 210. Next, the record for which "A" of the node number in the received sensor data coincides with the node number 2103 of the node state transition rule table 210, is selected from the selected records. Further, the record for which its identifier "base station A" coincides with the node location position 2105, is selected from the selected records.

Here, the base transceiver station A200 selects the record 2112 from the node state transition rule table 210.

Next, "R1" of the rule number 2101 is extracted from the selected record 2112.

Next, a new record 2213 is created in the node state history table 220. Next, "R1" of the extracted rule number 2101 is stored in the rule number 2204 of the new record 2213.

Next, "G1" of the group number 2201 of the extracted record 2211 is stored in the group number 2201 of the new record 2213. Next, "A" of the node number 2202 of the extracted record 2211 is stored in the node number 2202 of the new record 2213.

Next, the time T1 at which sensor data was received from the sensor node A100, is stored in the measurement time 2203 of the new record 2213.

In this way, the base transceiver station A200 adds the record 2213 of the node state history table 220.

Likewise, the base transceiver station A200 adds information relating to the sensor node B100 to the node state history table 220. Specifically, the record 2214 of the node state history table 220 is added.

Next, update of the group definition table 230 will be described.

First, the base transceiver station A200 updates the record 2311 relating to the sensor node A100 based on the received sensor data. Specifically, the time T1 at which sensor data was received, is stored in the measurement time 2303 of the record 2311 to be updated.

Likewise, the record 2312 relating to the sensor node B100 is updated. Specifically, the time T2 at which sensor data was received, is stored in the measurement time 2303 of the record 2312 to be updated.

Thereby, the base transceiver station A200 converts the group definition table 230 shown in FIG. 7A to the group definition table 230 shown in FIG. 7B.

In this way, the base transceiver station A200 updates the node state history group definition tables 220, 230. When the base transceiver station A200 a difference information receipt acknowledgment from the business application server 300, it performs commitment processing of the updated node state history group definition tables 220, 230.

At the same time, the base transceiver station B200 transmits a response request, but no sensor data is received from either of the sensor nodes 100. Due to this, the base transceiver station B200 determines that the sensor node 100 is not present in its communication range.

Next, the base transceiver station B200 performs measurement value difference information extraction processing (609) and state update processing (613) in an identical way to that of the base transceiver station A200. Since there is no change in the sensor node 100 in its communication range, the base transceiver station B200 does not transmit difference information to the business application server 300.

The sensor network system performs first node measurement processing (603) as described above.

After a fixed time has elapsed, the sensor network system performs second node measurement processing (614).

At this time, the group G1 in the sensor node A100 and sensor node B100 is present in the communication range of the base station A200.

First, the base transceiver station 200 transmits a response request in its communication range (615). The sensor node 100 which is present in the communication range of the base transceiver station 200 then receives the response request.

Here, the sensor node A100 and sensor node B100 receive a response request from the base transceiver station A200.

The sensor node A100, at a time T11, then transmits sensor data including its node number to the base transceiver station A200 (616). Likewise the sensor node B100, at a time T12, transmits sensor data including its node number to the base transceiver station A200 (617).

The base transceiver station A200 receives the sensor data from the sensor node A100 and sensor node B100.

Next, the base transceiver station A200 performs measurement value difference information extraction processing by comparing the received sensor data with the node state history table 220 (619). The difference extracted by this processing is a difference relating to the presence of the sensor node 100 belonging to the group.

Specifically, the base transceiver station A200 extracts "A" and "B" of the node number 2302 from the group definition table 230 (FIG. 7B). Next, a difference of "0" is calculated by comparing the extracted node number 2302 with the node number in the received sensor data.

The base transceiver station A200, at the time T13, transmits the difference information including the difference of "0" which was calculated to the business application server 300 (621). The difference information includes the group number "G1", the identifier "base station A" of the base transceiver station 200 and the measurement time "T12".

The business application server 300 receives the difference information from the base transceiver station A200. Next, based on the received difference information, the group state history group definition tables 320, 330 are updated (622).

Specifically, the record for which the group number "G1" in the received difference information coincides with the group number 3201 of the group state history table 320, is selected from the group state history table 320. Next, the record 3212 with the latest receiving time 3202 is selected from the selected records. Next, "R1" of the rule number 3204 is extracted from the selected record 3212.

Next, the record for which "R1" of the extracted rule number 3204 is included in the pre-transition rule number 3102 of the group state transition rule table 310, is selected from the group state transition rule table.

Next, the record for which the group number "G1" coincides with the group number 3103 of the group state transition rule table 310 in the received difference information, is selected from the selected records. Next, the record for which the identifier of the base transceiver station 200 in the received difference information coincides with the group location position 3105 of the group state transition rule table 310, is selected from the selected records.

Here, the business application server 300 selects the record 3112 from the group state transition rule table 310.

Next, "R1" of the rule number 3101 is extracted from the selected record 3112.

Next, a new record 3213 is created in the group state history table 320. Next, "R1" of the extracted rule number 3101 is stored in the rule number 3204 of the new record 3213.

Next, the group number "G1" in the received difference information is stored in the group number 3201 of the new record 3213. Next, the time "T13" at which the difference information was received, is stored in the receiving time 3202 of the new record 3213. Next, the identifier of the base transceiver station A200 in the received difference information, is stored in the group location position 3203 of the new record 3213.

Next, the business application server 300 updates the group definition table 330.

Specifically, since the difference in the difference information is "0", only the measurement time 3303 of the group definition table 330 is updated.

The business application server 300 stores the measurement time "T12" in the received difference information, in the measurement time 3303 of the group definition table 330.

Thereby, the business application server 300 converts the group definition table 330 shown in FIG. 4B to the group definition table 330 shown in FIG. 4C.

When the group state history group definition tables 320, 330 are updated, the business application server 300 transmits a difference information receipt acknowledgment to the base transceiver station A200.

On the other hand, when the base transceiver station A200 transmits the difference information to the business application server, state update processing is performed (623). Specifically, the base transceiver station A200 updates the node state history group definition tables 220, 230.

First, update of the node state history table 220 will be described.

The base transceiver station A200 extracts records 2213, 2214 from the node state history table 220.

Next, the base transceiver station A200 adds information relating to the sensor node A100 to the node state history table 220. For this purpose, "R1" of the rule number 2204 is extracted from the extracted record 2213.

Next, the base transceiver station A200 selects the record for which "R1" in the extracted rule number 2204 is included in the pre-transition rule number 2102 of the node state transition rule table 210, from the node state transition rule table 210. Next, the record for which "A" of the node number in the received sensor data coincides with the node number 2103 of the node state transition rule table 210, is selected from the selected records. Further, the record for which its identifier "base station A" coincides with the node location position 2105, is selected from the selected records.

Here, the base transceiver station A200 selects the record 2112 from the node state transition rule table 210.

Next, "R1" of the rule number 2101 is extracted from the selected record 2112.

Next, a new record 2215 is created in the node state history table 220. Next, "R1" of the extracted rule number 2101 is stored in the rule number 2204 of the new record 2215.

Next, "G1" of the group number 2201 of the extracted record 2213 is stored in the group number 2201 of the new record 2215. Next, "A" of the node number 2202 of the extracted record 2213 is stored in the node number 2202 of the new record 2215.

Next, the time T11 at which sensor data was received from the sensor node A100, is stored in the measurement time 2203 of the new record 2215.

In this way, the base transceiver station A200 adds the record 2215 of the node state history table 220.

Likewise, the base transceiver station A200 adds information relating to the sensor node B100 to the node state history table 220. Specifically, a record 2216 of the node state history table 220 is added.

Next, update of the group definition table 230 will be described.

First, the base transceiver station A200 updates a record 2313 relating to the sensor node A100 based on the received sensor data. Specifically, the time T11 at which sensor data was received, is stored in the measurement time 2303 of the record 2313 to be updated.

Likewise, a record 2314 relating to the sensor node B100 is updated. Specifically, the time T12 at which sensor data was received, is stored in the measurement time 2303 of the record 2314 to be updated.

Thereby, the base transceiver station A200 converts the group definition table 230 shown in FIG. 7B to the group definition table 230 shown in FIG. 7C.

In this way, the base transceiver station A200 updates the node state history group definition tables 220, 230. When a difference information receipt acknowledgment is received from the business application server 300, the base transceiver station A200 performs commitment processing of the updated node state history group definition tables 220, 230.

At the same time, the base transceiver station B200 transmits a response request, but no sensor data is received from either of the sensor nodes 100. Due to this, the base transceiver station B200 determines that the sensor node 100 is not present in its communication range.

Next, the base transceiver station B200 performs a measurement value difference information extraction processing (620) and state update processing (624) in an identical way to that of the base transceiver station A200. Since there is no change in the sensor node 100 which is present in its communication range, the base transceiver station B200 does not transmit difference information to the business application server 300.

The sensor network system performs second node measurement processing (614) as described above.

After a fixed time has elapsed, the sensor network system performs third node measurement processing (625).

At this time, the group G1 including the sensor node A100 and the sensor node B100 moves from the communication range of the base transceiver station A200 to the communication range of the base transceiver station B200.

First, the base transceiver station 200 transmits a response request in its own communication range (626). The sensor node 100 which is present in the communication range of the base transceiver station 200 then receives the response request.

Here, the sensor node A100 and sensor node B100 receive the response request from the base transceiver station B200.

The sensor node A100, at a time T21, then transmits sensor data including its node number to the base transceiver station B200 (628). Likewise the sensor node B100, at a time T22, transmits sensor data including its node number to the base transceiver station B200 (629).

The base transceiver station B200 receives the sensor data from the sensor node A100 and sensor node B100.

Next, the base transceiver station B200 performs measurement value difference information extraction processing by comparing the received sensor data with the node state history table 220 (631). The difference extracted by this processing is a difference relating to the presence of the sensor node 100 belonging to the group.

Specifically, the base transceiver station B200 extracts "A" and "B" of the node number 2302 from the group definition table 230 (FIG. 7D). Next, a difference of "0" is calculated by comparing the extracted node number 2302 with the node number in the received sensor data.

The base transceiver station B200, at a time T23, then transmits the difference information including the difference of "0" which was calculated to the business application server 300 (632). The difference information includes the group number "G1", the identifier "base station B" of the base transceiver station 200 and the measurement time "T22".

The business application server 300 receives difference information from the base transceiver station B200. Next, based on the received difference information, the group state history group definition tables 320, 330 are updated (633).

Specifically, the record for which the group number "G1" in the received difference information coincides with the group number 3201 of the group state history table 320, is selected from the group state history table 320. Next, the record 3213 with the latest receiving time 3202 is selected from the selected records. Next, "R1" of the rule number 3204 is extracted from the selected record 3213.

Next, the record for which "R1" of the extracted rule number 3204 is included in the pre-transition rule number 3102 of the group state transition rule table 310, is selected from the group state transition rule table.

Next, the record for which the group number "G1" in the received difference information coincides with the group number 3103 of the group state transition rule table 310, is selected from the selected records. Next, the record for which the identifier of the base transceiver station B200 in the received difference information coincides with the group location position 3105 of the group state transition rule table 310, is selected from the selected records.

Here, the business application server 300 selects the record 3113 from the group state transition rule table 310.

Next, "R2" of the rule number 3101 is extracted from the selected record 3113.

Next, a new record 3214 is created in the group state history table 320. Next, "R2" of the extracted rule number 3101 is stored in the rule number 3204 of the new record 3214.

Next, the group number "G1" in the received difference information is stored in the group number 3201 of the new record 3214. Next, the time "T23" at which the difference information was received, is stored in the receiving time 3202 of the new record 3214. Next, the identifier of the base transceiver station B200 in the received difference information is stored in the group location position 3203 of the new record 3214.

Next, the business application server 300 updates the group definition table 330.

Specifically, since the difference contained in difference information is "0", only the measurement time 3303 of the group definition table 330 is updated.

The business application server 300 stores the measurement time "T22" in the received difference information in the measurement time 3303 of the group definition table 330.

Thereby, the business application server 300 converts the group definition table 330 shown in FIG. 4C to the group definition table 330 in FIG. 4D.

When the group state history group definition tables 320, 330 are updated, the business application server 300 transmits a difference information receipt acknowledgment to the base transceiver station B200.

On the other hand, when the base transceiver station B200 transmits difference information to the business application server, state update processing is performed (635). Specifically, the base transceiver station B200 updates the node state history group definition tables 220, 230.

First, update of the node state history table 220 (FIG. 6B) will be described.

The base transceiver station B200 extracts a record 2235 and record 2236 from the node state history table 220.

Next, the base transceiver station B200 adds information relating to the sensor node A100 to the node state history table 220. For this purpose, "R0" of the rule number 2204 is extracted from the extracted record 2235.

Next, the base transceiver station B200 selects the record for which "R0" of the extracted rule number 2204 is included in the pre-transition rule number 2102 of the node state transition rule table 210 (FIG. 5B), from the node state transition rule table 210. Next, the record for which "A" of the node number in the received sensor data corresponds with the node number 2103 of the node state transition rule table 210, is selected from the selected records. Further, the record for which its identifier "base station B" coincides with its node location position 2105, is selected from the selected records.

Here, the base transceiver station B200 selects the record 2115 from the node state transition rule table 210.

Next, "R2" of the rule number 2101 is extracted from the selected record 2115.

Next, a new record 2237 is created in the node state history table 220 (FIG. 6B). Next, "R2" of the extracted rule number 2101 is stored in the rule number 2204 of the new record 2237.

Next, "G1" of the group number 2201 of the extracted record 2235 is stored in the group number 2201 of the new record 2237. Next, "A" of the node number 2202 of the extracted record 2235 is stored in the node number 2202 of the new record 2237.

Next, the time T21 at which sensor data was received from the sensor node A100, is stored in the measurement time 2203 of the new record 2237.

In this way, the base transceiver station B200 adds the record 2237 of the node state history table 220.

Likewise, the base transceiver station B200 adds information relating to the sensor node B100 to the node state history table 220. Specifically, a record 2238 of the node state history table 220 is added.

Next, update of the group definition table 230 (FIG. 7D) will be described.

First, the base transceiver station B200 updates a record 2321 relating to the sensor node A100 based on the received sensor data. Specifically, the time T21 at which sensor data was received, is stored in the measurement time 2303 of the record 2321 to be updated.

Likewise, the record 2322 relating to the sensor node B100 is updated. Specifically, the time T22 at which sensor data was received, is stored in the measurement time 2303 of the record 2322 to be updated.

Thereby, the base transceiver station B200 converts the group definition table 230 shown in FIG. 7D to the group definition table 230 shown in FIG. 7E.

In this way, the base transceiver station B200 updates the node state history group definition tables 220, 230. When a difference information receipt acknowledgment is received from the business application server 300, the base transceiver station B200 performs commitment processing of the updated node state history group definition tables 220, 230.

At the same time, the base transceiver station A200 transmits a response request, but no sensor data is received from either of the sensor nodes 100. Due to this, the base transceiver station A200 determines that the sensor node 100 is not present in its communication range.

Next, the base transceiver station A200 performs measurement value difference information extraction processing (630) and state update processing (634) in an identical way to that of the base transceiver station B200. Since the sensor node 100 is not present in its communication range, the base transceiver station A200 does not transmit difference information to the business application server 300.

The sensor network system performs third node measurement processing (625) as described above.

After a fixed time has elapsed, the sensor network system performs fourth node measurement processing (636).

At this time, the sensor node B100 moves out of the communication range of the base transceiver station B200. Therefore, the group G1 becomes only the sensor node A100.

First, the base transceiver station 200 transmits a response request in its communication range (637). The sensor node 100 which is present in the communication range of the base transceiver station 200 then receives the response request.

Here, the sensor node A100 receives the response request from the base transceiver station B200.

The sensor node A100, at a time T31, then transmits sensor data including its node number to the base transceiver station B200 (639).

The base transceiver station B200 receives the sensor data from the sensor node A100.

Next, the base transceiver station B200 performs measurement value difference information extraction processing by comparing the received sensor data with the node state history table 220 (641). The difference extracted by this processing is a difference relating to the presence of the sensor node 100 belonging to the group.

Specifically, the base transceiver station B200 extracts "A" and "B" of the node number 2302 from the group definition table 230 (FIG. 7E). Next, the difference "B: NotPresent" is calculated by comparing the extracted node number 2302 with the node number in the received sensor data. Specifically, the base transceiver station B200 recognizes that the sensor node B100 was missing from the group G1.

The base transceiver station B200, at the time T33, transmits the difference information including the difference "B: NotPresent" which was calculated to the business application server 300 (642). The difference information includes the group number "G1", the identifier "base station B" of the base transceiver station B200 and the measurement time "T31".

The business application server 300 receives the difference information from the base transceiver station B200. Next, based on the received difference information, the group state history group definition tables 320, 330 are updated (643).

Specifically, the record for which the group number "G1" in the received difference information coincides with the group number 3201 of the group state history table 320, is selected from the group state history table 320. Next, the record 3214 with the latest receiving time 3202 is selected from the selected records. Next, "R2" of the rule number 3204 is extracted from the selected record 3214.

Next, the record for which "R2" of the extracted rule number 3204 is included in the pre-transition rule number 3102 of the group state transition rule table 310, is selected from the group state transition rule table.

Next, the record for which the group number "G1" in the received difference information coincides with the group number 3103 of the group state transition rule table 310, is selected from the selected records. Further, the record for which the identifier of the base transceiver station B200 in the received difference information coincides with the group location position 3105 of the group state transition rule table 310, is selected from the selected records.

Here, the business application server 300 selects the record 3113 from the group state transition rule table 310.

Next, "R2" of the rule number 3101 is extracted from the selected record 3113.

Next, a new record 3215 is created in the group state history table 320.

Next, "R2" of the extracted rule number 3101 is stored in the rule number 3204 of the new record 3215.

Next, the group number "G1" in the received difference information is stored in the group number 3201 of the new record 3215. Next, the time "T33" at which the difference information was received, is stored in the receiving time 3202 of the new record 3215. Next, the identifier of the base transceiver station B200 in the received difference information is stored in the group location position 3203 of the new record 3215.

Next, the business application server 300 updates the group definition table 330 (FIG. 4D).

Specifically, since the difference in the difference information is "B: NotPresent", the sensor node B100 is deleted from the group G1. The record for which the difference "B" in the difference information coincides with the node number 3302 of the group definition table 330, is therefore deleted from the group definition table 330. Next, the measurement time "T31" in the received difference information is stored in a measurement time 3303 of the group definition table 330.

Thereby, the business application server 300 converts the group definition table 330 shown in FIG. 4D to the group definition table 330 shown in FIG. 4E.

When the group state history group definition tables 320, 330 are updated, the business application server 300 transmits a difference information receipt acknowledgment to the base transceiver station B200, On the other hand, when the base transceiver station B200 transmits difference information to the business application server, state update processing is performed (645). Specifically, the base transceiver station B200 updates the node state history group definition tables 220, 230.

First, update of the node state history table 220 (FIG. 6B) will be described.

The base transceiver station B200 extracts a record 2237 and record 2238 from the node state history table 220.

Next, the base transceiver station B200 adds the information relating to the sensor node A100 to the node state history table 220. For this purpose, "R2" of the rule number 2204 is extracted from the extracted record 2237.

Next, the base transceiver station B200 selects the record for which "R2" of the extracted rule number 2204 is included in the pre-transition rule number 2102 of the node state transition rule table 210 (FIG. 5B), from the node state transition rule table 210. Next, the record for which "A" of the node number in the received sensor data coincides with the node number 2103 of the node state transition rule table 210, is selected from the selected records. Further, the record for which its identifier "base station B" coincides with the node location position 2105, is selected from the selected records.

Here, the base transceiver station B200 selects the record 2115 from the node state transition rule table 210.

Next, "R2" of the rule number 2101 is extracted from the selected record 2115.

Next, a new record 2239 is created in the node state history table 220 (FIG. 6B). Next, "R2" of the extracted rule number 2101 is stored in the rule number 2204 of the new record 2239.

Next, "G1" of a group number 2201 of the extracted record 2237 is stored in the group number 2201 of the new record 2239. Next, "A" of the node number 2202 of the extracted record 2237 is stored in the node number 2202 of the new record 2239.

Next, the time T31 at which sensor data was received from the sensor node A100 is stored in the measurement time 2203 of the new record 2239.

In this way, the base transceiver station B200 adds the record 2239 of the node state history table 220.

Next, the base transceiver station B200 adds information relating to the sensor node B100 to the node state history table 220. For this purpose, "R2" of the rule number 2204 is extracted from the extracted record 2238.

Next, the base transceiver station B200 selects the record for which "R2" of the extracted rule number 2204 is included in the pre-transition rule number 2102 of the node state transition rule table 210 (FIG. 5B), from the node state transition rule table 210. Next, the presence information 2104 selects the record "not present" from the selected records.

Here, the base transceiver station B200 selects the record 2116 from the node state transition rule table 210.

Next, "R3" of the rule number 2101 is extracted from the selected record 2116.

Next, a new record 2240 is created in the node state history table 220 (FIG. 6B). Next, "R3" of the extracted rule number 2101 is stored in the rule number 2204 of the new record 2240.

Next, "G1" of the group number 2201 of the extracted record 2238 is stored in the group number 2201 of the new record 2240. Next, "B" of the node number 2202 of the extracted record 2238 is stored in the node number 2202 of the new record 2240.

Next, the time T31 at which sensor data was received from the sensor node A100 is stored in the measurement time 2203 of the new record 2240.

In this way, the base transceiver station B200 adds the record 2240 of the node state history table 220.

Next, update of the group definition table 230 (FIG. 7E) will be described.

First, the base transceiver station B200 updates the record 2323 relating to the sensor node A100 based on the received sensor data. Specifically, the time T31 at which sensor data was received is stored in the measurement time 2303 of the record 2323 to be updated.

Next, a record 2324 relating to the sensor node B100 is updated. Specifically, since sensor data was not received from the sensor node B100, the record 2324 is deleted from the group definition table 230.

Thereby, the base transceiver station B200 converts the group definition table 230 shown in FIG. 7E to the group definition table 230 shown in FIG. 7F.

In this way, the base transceiver station B200 updates the node state history group definition tables 220, 230. When a difference information receipt acknowledgment is received from the business application server 300, the base transceiver station B200 performs commitment processing of the updated node state history group definition tables 220, 230.

At the same time, the base transceiver station A200 transmits a response request, but no sensor data is received from either of the sensor nodes 100. Due to this, the base transceiver station A200 determines that the sensor node 100 is not present in its communication range.

Next, the base transceiver station A200 performs measurement value difference information extraction processing (640) and state update processing (644) in an identical way to that of the base transceiver station B200. Since the sensor node 100 is not present in its communication range, the base transceiver station A200 does not transmit difference information to the business application server 300.

The sensor network system performs fourth node measurement processing (636) as described above.

In this embodiment, the business application server 300 and the base transceiver station 200 manage plural sensor nodes 100 as a group, and the base transceiver station 200 transmits the information relating to the sensor node 100 to the business application server 300 in group units. Since the information which the base transceiver station 200 transmits to the business application server 300 at this time is summarized, the information amount transmitted to the business application server 300 can be reduced.

In this embodiment, the business application server 300 and the base transceiver station 200 have information relating to the sensor node 100 included in a group. Based on this information and the sensor data received from the sensor node 100, the base transceiver station 200 calculates difference information relating to the presence of the sensor node, and the base transceiver station 200 transmits only the difference information to the business application server 300.

In other words, since the base transceiver station 200 transmits only the difference information in the information relating to the group to the business application server 300, the information amount transmitted to the business application server 300 can be further reduced.

The node measurement processing of the sensor network system of this embodiment should also be considered.

Figure 9:
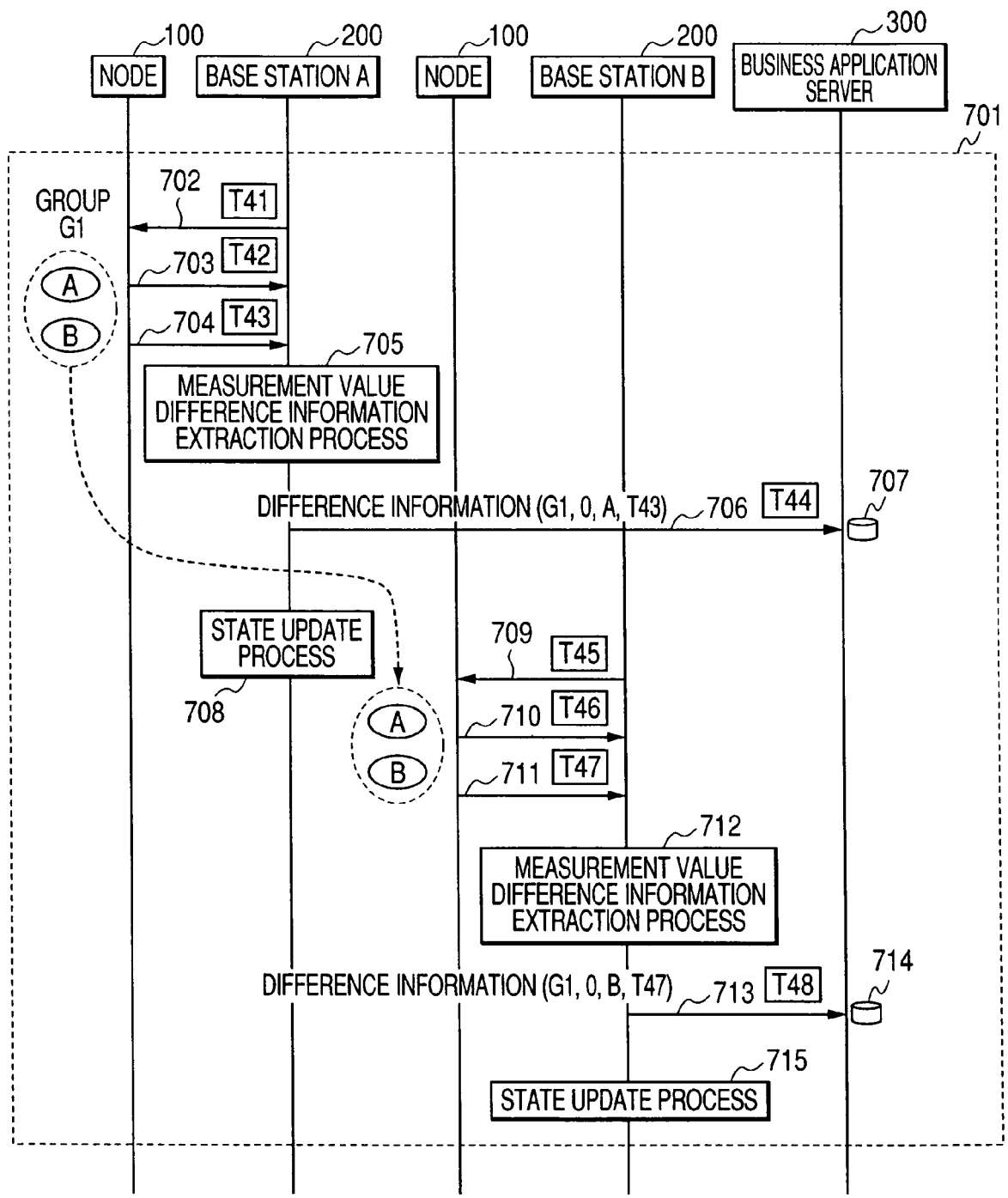
FIG. 9 is a diagram of the points in the sensor network system according to the first embodiment of the invention which should be considered.

FIG. 9 is a schematic diagram showing points relating to the sensor network system according to the first embodiment of the invention which should be considered.

This arises when the transmission timing of the response request differs for each base transceiver station 200.

The sensor network system performs node measurement processing (701).

At the beginning of node measurement processing, the group G1 including the sensor node A100 and the sensor node B100 are present in the communication range of the base transceiver station A200.

First, at a time T41, the base transceiver station A200 transmits a response request in its communication range (702). The sensor node A100 and the sensor node B100 then receive the response request from the base transceiver station A200.

Next, at a time T42, the sensor node A100 transmits sensor data including its node number to the base transceiver station A200 (703). Likewise, at a time T43, the sensor node B100 transmits the sensor data including its node number to the base transceiver station A200 (704).

The base transceiver station A200 receives the sensor data from the sensor node A100 and sensor node B100.

Next, the base transceiver station A200 performs measurement value difference information extraction processing by comparing the received sensor data with the node state history table 220 (705). The difference extracted by this processing is a difference relating to the presence of the sensor node 100 belonging to the group. The base transceiver station A200 calculates a difference of "0" by measurement value difference information extraction processing.

Next, at a time T44, the base transceiver station A200 transmits the difference information including the difference of "0" which was calculated to the business application server 300 (706). The difference information includes the group number "G1", the identifier "base station A" of the base transceiver station 200 and the measurement time "T43".

The base transceiver station A200 then performs state update processing by updating the node state history group definition tables 220, 230 (708).

The business application server 300 receives the difference information from the base transceiver station A200. Next, based on the received difference information, the group state history group definition tables 320, 330 are updated (707).

On the other hand, between the time T41 and a time T45, the group G1 including the sensor node A100 and sensor node B100 moves from the communication range of the base transceiver station A200 to the communication range of the base transceiver station B200. The time between the time T41 and time T45 is very short, and is within the time required by one node measurement process.

The base transceiver station B200, at the time T45, transmits a response request in its communication range (709).

The sensor node A100 and sensor node B100 then receive the response request from the base transceiver stations B200. Next, at a time T46, the sensor node A100 transmits sensor data including its node number to the base transceiver station B200 (710). Likewise, at a time T47, the sensor node B100 transmits sensor data including its node number to the base transceiver station B200 (711).

The base transceiver station B200 receives the sensor data from the sensor node A100 and sensor node B100.

Next, the base transceiver station B200 performs measurement value difference information extraction processing by comparing the received sensor data with the node state history table 220 (712). The difference extracted by this processing is a difference relating to the presence of the sensor node 100 belonging to the group. The base transceiver station B200 then calculates a difference of "0" by measurement value difference information extraction processing.

Next, at the time T44, the base transceiver station B200 transmits difference information including the difference of "0" which was calculated to the business application server 300 (713). The difference information includes the group number "G1", the identifier "base station B" of the base transceiver station 200 and the measurement time "T47".

The base transceiver station B200 then performs state update processing by updating the node state history group definition tables 220, 230 (715).

The business application server 300 receives the difference information from the base transceiver station B200. Next, based on the received difference information, the group state history group definition tables 320, 330 are updated (714).

The business application server 300 then determines that the group G1 is present in both the communication range of the base transceiver station A200 and the communication range of the base transceiver station B200. As a result, the business application server 300 cannot determine the position of the group G1.

The elimination of this collision state will now be described.

Figure 10:
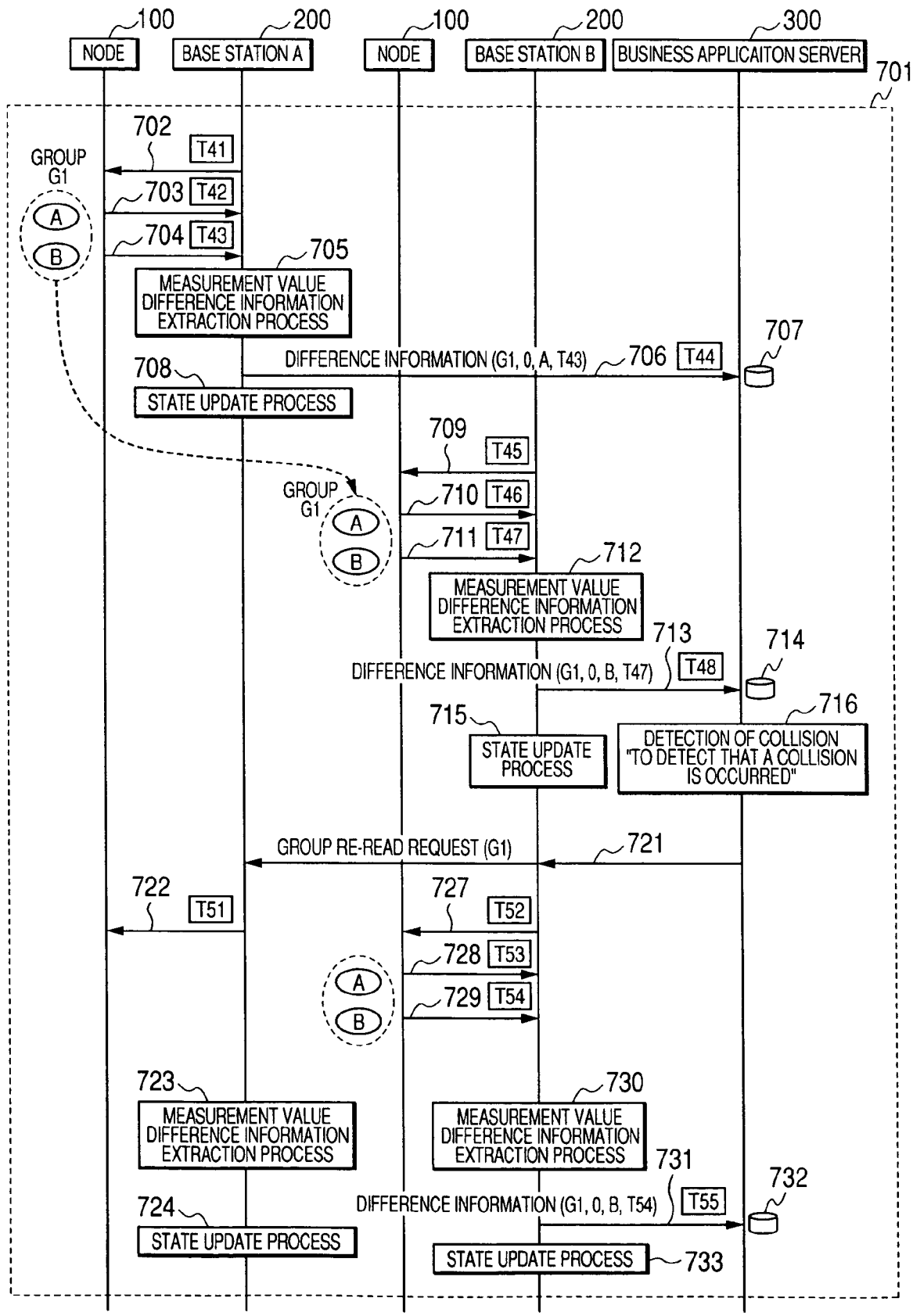
FIG. 10 is a sequence chart of processing when a collision of the sensor network system is detected according to the first embodiment of the invention.

FIG. 10 is a sequence chart of the processing when a collision of the sensor network system according to the first embodiment of the invention is detected.

The sensor network system performs node measurement processing (701).

Step 702 to step 715 of this chart are identical to the steps described in FIG. 9, and their description is therefore omitted.

When difference information is received from plural base transceiver stations 200 during one node measurement processing (716), the business application server 300 determines there is a collision, The business application server 300 then transmits a group re-read request to the base transceiver station 200 which transmitted the difference information. Here, the business application server 300 transmits the group re-read request to the base transceiver station A200 and the base transceiver station B200. The group re-read request contains the group number "G1".

The base transceiver station A200 and the base transceiver station B200 receive the group re-read request from the business application server 300. The base transceiver station A200, at a time T51, then transmits a response request in its communication range (722). Likewise, at a time T52, the base transceiver station B200 transmits a response request in its communication range (723).

The sensor node A100 and sensor node B100 then receive the response request from the base transceiver station B200. Next, at a time T53, the sensor node A100 transmits sensor data including its node number to the base transceiver station B200 (728). Likewise, at a time T54, the sensor node B100 transmits sensor data including its node number to the base transceiver station B200 (729).

The base transceiver station B200 receives the sensor data from the sensor node A100 and sensor node B100.

Next, the base transceiver station B200 performs measurement value difference information extraction processing by comparing the received sensor data with the node state history table 220 (730). The difference extracted by this processing is a difference relating to the presence of the sensor node 100 belonging to the group. The base transceiver station B200 then calculates a difference of "0" by measurement value difference information extraction processing.

Next, at a time T55, the base transceiver station B200 transmits the difference information including the difference of "0" which was calculated to the business application server 300 (731). The difference information contains the group number "G1", the identifier "base station B" of the base transceiver station 200 and the measurement time "T54".

The base transceiver station B200 then performs state update processing by updating the node state history group definition tables 220, 230 (733).

At the same time, the base transceiver station A200 transmits a response request, but no sensor data is received from either of the sensor nodes 100. Due to this, the base transceiver station A200 determines that the sensor node 100 is not present in its communication range.

Next, the base transceiver station A200 performs measurement value difference information extraction processing (723) and state update processing (724) in an identical way to that of the base transceiver station B200. Since the sensor node 100 is not present in its communication range, the base transceiver station A200 does not transmit difference information to the business application server 300.

The business application server 300 receives difference information only from the base transceiver station B200. Due to this, the business application server 300 determines that the group G1 is present in the communication range of the base transceiver station B. Based on the received difference information, the group state history group definition tables 320, 330 are updated (732).

As described above, when plural base transceiver stations 200 detect the sensor node 100, these base transceiver stations 200 re-read the sensor node 100. Due to this, the business application server 300 can determine the position of the sensor node 100.

Next, another method of resolving a collision state will be described.

Figure 11:
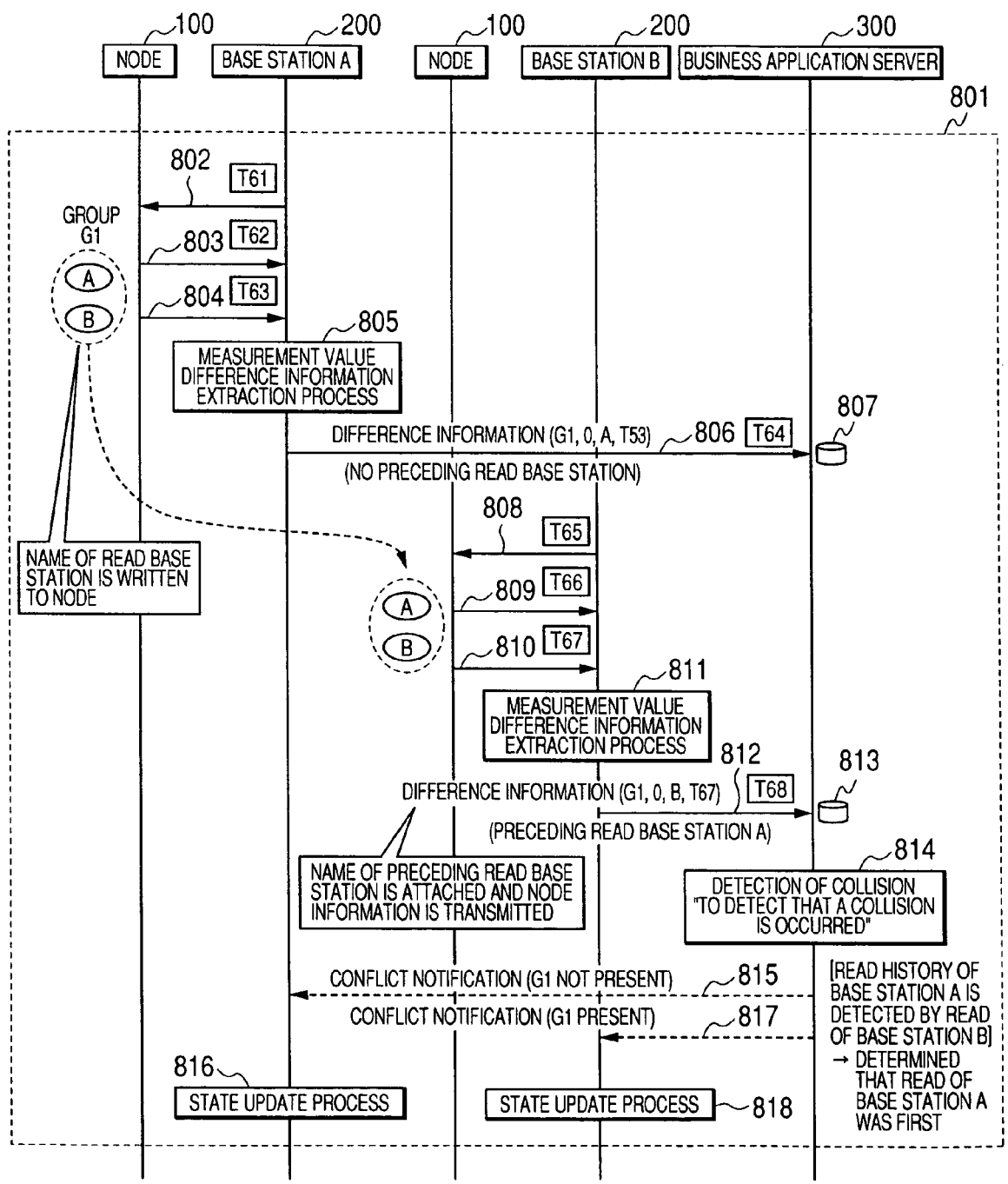
FIG. 11 is a sequence chart of processing when a collision of the sensor network system is detected according to the first embodiment of the invention.

FIG. 11 is a sequence chart of the processing when a collision of the sensor network system according to the first embodiment of the invention is detected.

In this chart, the sensor node 100 stores the identifier of the transmitting origin of the response request which was received. When the response request is received, the identifier of the base transceiver station 200 (preceding read base station) which is the transmission origin of the immediately preceding response request is included in the sensor data and transmitted.

First, at a time T61, the base transceiver station A200 transmits a response request in its communication range (802). The sensor node A100'and sensor node B100 then receive the response request from the base transceiver station A200.

Next, the sensor node A100 stores the identifier of the base transceiver station A200 which is the transmitting origin of the received response request. At a time T62, the sensor data including its node number is transmitted to the base transceiver station A200 (803). This sensor data does not contain the identifier of the preceding read base station.

Likewise, the sensor node B100 stores the identifier of the base transceiver station A200 which is the transmitting origin of the received response request. At a time T63, the sensor data including its node number is transmitted to the base transceiver station A200 (804). This sensor data does not contain the identifier of the preceding read base station.

The base transceiver station A200 receives the sensor data from the sensor node A100 and sensor node B100.

Next, the base transceiver station A200 performs measurement value difference information extraction processing by comparing the received sensor data with the node state history table 220 (805). The difference extracted by this processing is a difference relating to the presence of the sensor node 100 belonging to the group. The base transceiver station A200 then calculates a difference of "0" by measurement value difference information extraction processing.

Next, at a time T64, the base transceiver station A200 transmits the difference information including the difference of "0" which was calculated to the business application server 300 (806). This difference information includes the group number "G1", the identifier "base station A" of the base transceiver station A200 and the measurement time "T63". This difference information also includes information to the effect that there is no preceding read base station.

The business application server 300 then receives difference information from the base transceiver station A200. Next, based on the received difference information, the group state history group definition tables 320, 330 are updated (807).

On the other hand, between the time T61 and a time T65, the group G1 including the sensor node A100 and sensor node B100 moves from the communication range of the base transceiver station A200 to the communication range of the base transceiver station B200. The time between the time T61 and time T65 is very short, and is within the time required for one node measurement process.

The base transceiver station B200, at the time T65, then transmits a response request in its communication range (808).

The sensor node A100 and sensor node B100 receive the response request from the base transceiver station B200.

Next, at a time T66, the sensor node A100 transmits sensor data including its node number to the base transceiver station B200 (809). At this time, the sensor node A100 includes the identifier "base station A" of the stored preceding read base station in the sensor data. The sensor node A100 then stores the identifier of the base transceiver station B200 which is the transmitting origin of the received response request.

Likewise, at a time T67, the sensor node B100 transmits sensor data including its node number to the base transceiver station B200 (810). At this time, the sensor node B100 includes the identifier "base station A" of the stored preceding read base station in the sensor data. The sensor node B100 then stores the identifier of the base transceiver station B200 which is the transmitting origin of the received response request.

The base transceiver station B200 then receives the sensor data from the sensor node A100 and sensor node B100.

Next, the base transceiver station B200 performs measurement value difference information extraction processing by comparing the received sensor data with the node state history table 220 (811). The difference extracted by this processing is a difference relating to the presence of the sensor node 100 belonging to the group. The base transceiver station B200 then calculates a difference of "0" by measurement value difference information extraction processing.

Next, at a time T68, the base transceiver station B200 transmits the difference information including the difference of "0" which was calculated to the business application server 300 (812). This difference information includes the group number "G1", the identifier "base station B" of the base transceiver station 200 and the measurement time "T67". This difference information also includes the identifier "base station A" of the preceding read base station.

The business application server 300 receives the difference information from the base transceiver station B200. Next, based on the received difference information, the group state history group definition tables 320, 330 are updated (813).

When difference information is received from plural base transceiver stations 200 during one node measurement process, the business application server 300 determines there is a collision (814).

Hence, the identifier "base station A" of the preceding read base station is extracted from the difference information received from the base transceiver station B200. Next, the position of the group G1 is determined based on the identifier "base station A" of the extracted preceding read base station. Specifically, it is determined that the group G1 moved from the communication range of the base transceiver station A200 to the communication range of the base transceiver station B200.

Next, a collision signal including the position of the group G1 determined, is transmitted to the base transceiver station 200.

Specifically, the business application server 300 transmits a collision signal including a statement that the group G1 is not present in the communication range of the base transceiver station A200, to the base transceiver station A200 (815).

The base transceiver station A200 receives the collision signal from the business application server 300. State update processing is then performed by updating the node state history group definition tables 220, 230 based on the collision signal received (816).

The business application server 300 transmits the collision signal including a statement that the group G1 is present in the communication range of the base transceiver station B200, to the base transceiver station B200 (817).

The base transceiver station B200 receives the collision signal from the business application server 300. State update processing is then performed by updating the node state history group definition tables 220, 230 based on the collision signal received (818).

As described above, even in the case where plural base transceiver stations 200 detect the sensor node 100, the business application server 300 can determine the position of the sensor node 100.

Embodiment 2

In the second embodiment of the invention, the sensor node 100 measures the surrounding temperature by a sensor. The sensor node 100 then transmits sensor data including the measured temperature to the base transceiver station 200. The sensor node 100 may measure a physical quantity other than temperature.

Since the construction of the sensor network system of the second embodiment is identical to that of the sensor network system (FIG. 1) according to the first embodiment, its description will be omitted.

FIG. 12A is a schematic diagram of the group definition table 330 of the business application server 300 at the time T0 according to the second embodiment of the invention.

FIG. 12B is a schematic diagram of the group definition table 330 of the business application server 300 at the time T3 according to the second embodiment of the invention.

FIG. 12C is a schematic diagram of the group definition table 330 of the business application server 300 at the time T13 according to the second embodiment of the invention.

FIG. 12D is a schematic diagram of the group definition table 330 of the business application server 300 at the time T23 according to the second embodiment of the invention.

FIG. 12E is a schematic diagram of the group definition table 330 of the business application server 300 at the time T33 according to the second embodiment of the invention.

The group definition table 330 includes a group number 3301, node number 3302, measurement time 3303 and temperature reading on a thermometer 3304.

Since the group number 3301, node number 3302 and measurement time 3303 are identical to those in the construction of the group definition tables (FIGS. 4A-E) according to the first embodiment, their description will be omitted.

The temperature reading on the thermometer 3304 is the temperature measured by this sensor node 100.

FIG. 13A is a schematic diagram of the node state history table 220 of the base transceiver station A200 according to the second embodiment of the invention. FIG. 13B is a schematic diagram of the node state history table 220 of the base transceiver station B200 according to the second embodiment of the invention.

The node state history table 220 includes the group number 2201, node number 2202, measurement time 2203, rule number 2204 and temperature reading on a thermometer 2205.

Since the group number 2201, node number 2202, measurement time 2203 and rule number 2204 are identical to those in the construction of the node state history tables (FIGS. 6A and 6B) according to the first embodiment, their description will be omitted.

The measured temperature 2205 is the temperature measured by this sensor node 100.

Figure 14:
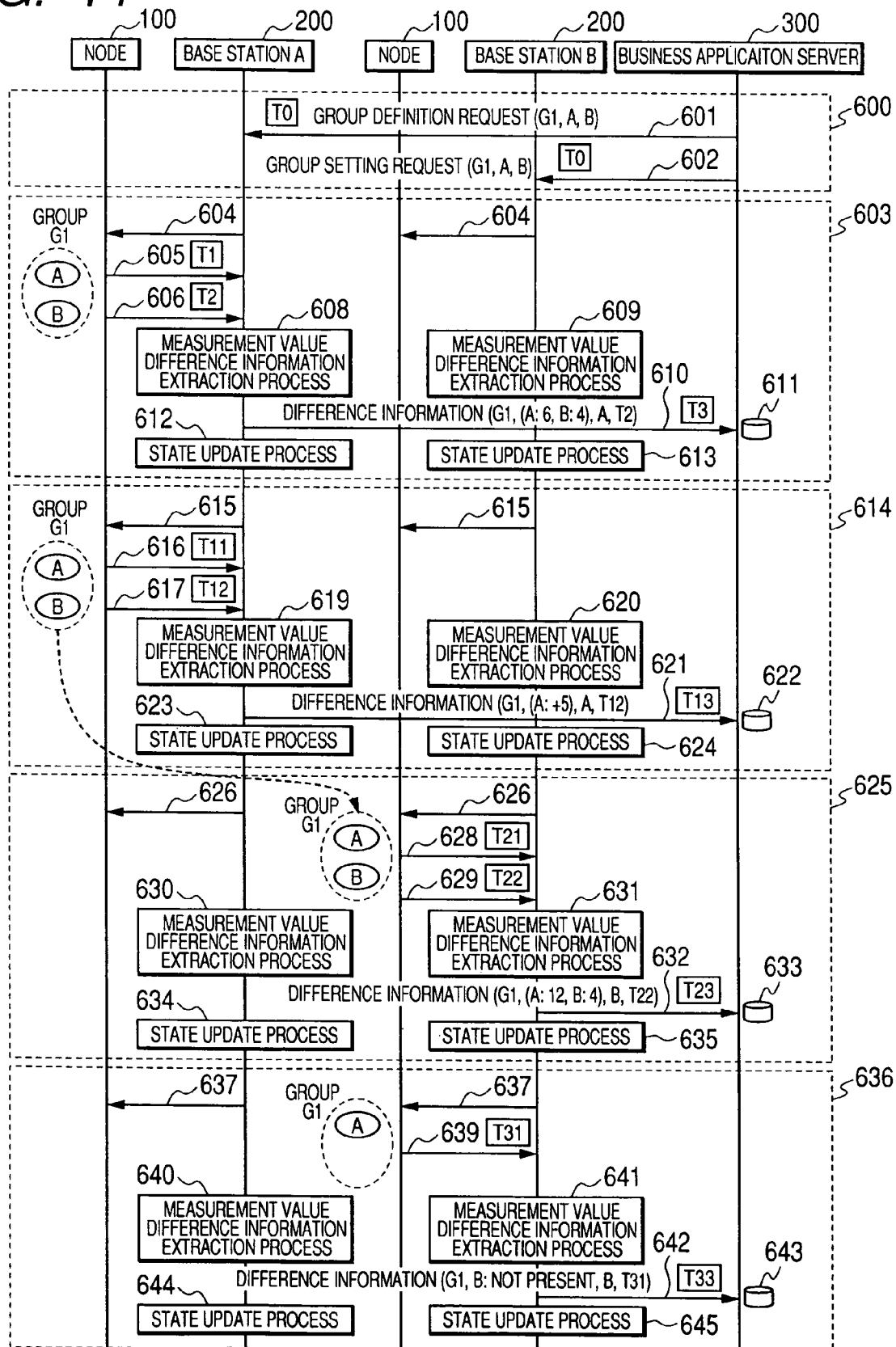
FIG. 14 is a sequence chart of processing of the sensor network system according to the second embodiment of the invention.

FIG. 14 is a sequence chart of the processing of the sensor network system according to the second embodiment of the invention.

Here, only the difference from the processing (FIG. 8) of the sensor network system according to the first embodiment will be described. For identical processing, the same numbers are attached and their description will be omitted.

The sensor network system performs identical processing from a Step 601 to Step 604 as in the first embodiment.

When a response request is received in the Step 604, the sensor node A100 and sensor node B100 measure temperature using their sensors. Next, the sensor node A100 transmits sensor data including the measured temperature of "6° C." to the base transceiver station A200 (605). Likewise, the sensor node B100 transmits sensor data including the measured temperature of "4° C." to the base transceiver station A200 (606).

The base transceiver station A200 receives the sensor data from the sensor node A100 and sensor node B100.

Next, the base transceiver station A200 performs measurement value difference information extraction processing by comparing the received sensor data with the node state history table 220 (608). The difference extracted by this processing is a temperature difference measured by the sensor node 100.

Specifically, the base transceiver station A200 selects a record 2251 and record 2252 from the node state history table 220 (FIG. 13A).

Next, the measured temperature 2205 is extracted from the selected record 2251 and record 2252. The value is not stored in the measured temperature 2205.

Hence, the base transceiver station A200 transmits difference information including the temperatures "A:6° C., B:4° C." in the received sensor data to the business application server 300 (610). The difference information includes the group number "G1", the identifier "base station A" of the base transceiver station 200 and the measurement time "T2".

The business application server 300 receives the difference information from the base transceiver station A200. Next, based on the received difference information, the group state history group definition tables 320, 330 are updated (611). At this time, the business application server 300 stores the temperature in the received difference information in the measured temperature 3304 of the group definition table 330.

Thereby, the business application server 300 converts the group definition table 330 shown in FIG. 12A to the group definition table 330 shown in FIG. 12B.

On the other hand, when the base transceiver station A200 transmits difference information to the business application server 300, state update processing is performed (612). Specifically, the base transceiver station A200 updates the node state history group definition tables 220, 230. At this time, the base transceiver station A200 stores the temperature "6° C." in the sensor data received from the sensor node A100, in the measured temperature 2205 of the node state history table 220. Likewise, the temperature "4° C." in the sensor data received from the sensor node B100 is stored in the measured temperature 2205 of the node state history table 220.

The sensor network system performs first node measurement processing (603) as described above.

After a fixed time has elapsed, the sensor network system performs second node measurement processing (614).

First, the base transceiver station 200 transmits a response request in its communication range (615).

The sensor node A100 and sensor node B100 receive the response request from the base transceiver station A200. The sensor node A100 and sensor node B100 then measure temperature using their sensors. Next, the sensor node A100 transmits sensor data including the measured temperature of "11° C." to the base transceiver station A200 (616). Likewise, the sensor node B100 transmits sensor data including the measured temperature of "4° C." to the base transceiver station A200 (617).

The base transceiver station A200 receives the sensor data from the sensor node A100 and sensor node B100.

Next, the base transceiver station A200 performs measurement value difference information extraction processing by comparing the received sensor data with the node state history table 220 (619). The difference extracted by this processing is the difference between the temperature measured by the sensor node 100 on the immediately preceding occasion and the temperature measured on the current occasion.

Specifically, the base transceiver station A200 selects a record 2253 and record 2254 from the node state history table 220 (FIG. 13A).

Next, the measured temperature 22056 of "degrees C" is extracted from the selected record 2253. Next, the measured temperature 2205 of "6° C." is subtracted from the measured temperature of "11° C." in the sensor data received from the sensor node A100 so as to calculate a difference of "+5° C." relating to the sensor node A100.

Likewise, the measured temperature 2205 of "4° C." is extracted from the selected record 2254. Next, the measured temperature 2205 of "4° C." is subtracted from the measured temperature of "4° C." in the sensor data received from the sensor node B100 so as to calculate a difference of "0" relating to the sensor node B100. When the calculated difference is "0", the base transceiver station A200 does not transmit this difference to the business application server 300.

Hence, the base transceiver station A200 transmits the difference information including the difference "A:+5° C." which was calculated to the business application server 300 (621). The difference information includes the group number "G1", the identifier "base station A" of the base transceiver station 200 and the measurement time "T12".

The business application server 300 receives the difference information from the base transceiver station A200. Next, based on the received difference information, the group state history group definition tables 320, 330 are updated (622). At this time, the business application server 300 adds the difference of "+5° C." in the received difference information to the measured temperature 3304 of the group definition table 330.

Thereby, the business application server 300 converts the group definition table 330 shown in FIG. 12B to the group definition table 330 shown in FIG. 12C.

On the other hand, when the base transceiver station A200 transmits difference information to the business application server 300, state update processing is performed (623). Specifically, the base transceiver station A200 updates the node state history group definition tables 220, 230. At this time, the base transceiver station A200 stores the temperature of "11° C." in the sensor data received from the sensor node A100, in the measured temperature 2205. Likewise, the temperature of "4° C." in the sensor data received from the sensor node B100 is stored in the measured temperature 2205.

The sensor network system performs second node measurement processing (614) as described above.

In second node measurement processing, the base transceiver station A200 transmits difference information omitting information relating to the sensor node B100, to the business application server 300. The base transceiver station A200 can therefore reduce the data amount transmitted to the business application server 300.

Moreover, the base transceiver station 200 transmits only a difference in the measurement values of the sensor node 100 to the business application server in group units. Due to this, the base transceiver station A200 can further reduce the data amount transmitted to the business application server 300.

After a fixed time has elapsed, the sensor network system performs third node measurement processing (625).

First, the base transceiver station 200 transmits a response request in its communication range (626).

The sensor node A100 and sensor node B100 receive the response request from the base transceiver station B200. The sensor node A100 and sensor node B100 then measure temperature using their sensors. Next, the sensor node A100 transmits sensor data including a measured temperature of "12° C." to the base transceiver station B200 (628). Likewise, the sensor node B100 transmits sensor data including a measured temperature of "4° C." to the base transceiver station B200 (629).

The base transceiver station B200 receives the sensor data from the sensor node A100 and sensor node B100.

Next, the base transceiver station B200 performs measurement value difference information extraction processing by comparing the received sensor data with the node state history table 220 (631). The difference extracted by this processing is the temperature difference measured by the sensor node 100.

Specifically, the base transceiver station B200 selects a record 2265 and record 2266 from the node state history table 220 (FIG. 13B).

Next, the measured temperature 2205 is extracted from the selected records 2265, 2266. The value is not stored in the measured temperature 2205.

Hence, the base transceiver station B200 transmits difference information including the temperatures "A:12° C., B:4° C." in the received sensor data to the business application server 300 (632). The difference information includes the group number "G1", the identifier "base station B" of the base transceiver station B200 and the measurement time T22.

The business application server 300 receives the difference information from the base transceiver station B200. Next, based on the received difference information, the group state history group definition tables 320, 330 are updated (633). At this time, the business application server 300 stores the temperature in the received difference information in the measured temperature 3304 of the group definition table 330.

Thereby, the business application server 300 converts the group definition table 330 shown in FIG. 12C to the group definition table 330 shown in FIG. 12D.

On the other hand, when the base transceiver station B200 transmits difference information to the business application server 300, state update processing is performed (635). Specifically, the base transceiver station B200 updates the node state history group definition tables 220, 230. At this time, the base transceiver station B200 stores the temperature of "12° C." in the sensor data received from the sensor node A100, in the measured temperature 2205 of the node state history table 220. Likewise, the temperature of "4° C." in the sensor data received from the sensor node B100 is stored in the measured temperature 2205 of the node state history table 220.

The sensor network system performs third node measurement processing (625) as described above.

After a fixed time has elapsed, the sensor network system performs fourth node measurement processing (636).

First, the base transceiver station 200 transmits a response request in its communication range (637).

The sensor node A100 receives the response request from the base transceiver station B200. The sensor node A100 then measures the temperature using its sensor. Next, the sensor node A100 transmits sensor data including the measured temperature of "12° C." to the base transceiver station B200 (639).

The base transceiver station B200 receives the sensor data from the sensor node A100.

Next, the base transceiver station B200 performs measurement value difference information extraction processing by comparing the received sensor data with the node state history table 220 (631). The difference extracted by this processing includes a difference measured by the sensor node 100, and a difference relating to the presence of the sensor node 100 belonging to the group.

Specifically, the base transceiver station B200 selects a record 2267 and record 2268 from the node state history table 220 (FIG. 13B).

Next, the measured temperature 2205 of "12° C." is extracted from the selected record 2267. Next, the measured temperature 2205 of "12° C." is subtracted from the measured temperature of "12° C." in the sensor data received from the sensor node A100 so as to calculate a difference of "0 degree C" relating to the sensor node A100. When the calculated difference is "0", the base transceiver station B200 does not transmit this difference to the business application server 300.

Next, "A" and "B" of the node number 2202 are extracted from the selected records 2267, 2268. Next, the difference "B: NotPresent" relating to the presence of the sensor node 100 is calculated by comparing the extracted node number 2202 with the node number in the received sensor data. Specifically, the base transceiver station B200 recognizes that the sensor node B100 was missing from the group G1.

The base transceiver station B200, at the time T33, transmits the difference information including the difference "B: NotPresent" which was calculated to the business application server 300 (642). The difference information includes the group number "G1", the identifier "base station B" of the base transceiver station 200 and the measurement time "T31".

The business application server 300 receives the difference information from the base transceiver station B200. Next, based on the received difference information, the group state history group definition tables 320, 330 are updated (643).

Thereby, the business application server 300 converts the group definition table 330 shown in FIG. 12D to the group definition table 330 shown in FIG. 12E.

On the other hand, when the base transceiver station B200 transmits the difference information to the business application server 300, state update processing is performed (645). Specifically, the base transceiver station B200 updates the node state history group definition tables 220, 230. At this time, the base transceiver station B200 stores the temperature of "12° C." in the sensor data received from the sensor node A100, in the measured temperature 2205 of the node state history table 220.

The sensor network system performs fourth node measurement processing (636) as described above.

In the fourth node measurement processing, the base transceiver station B200 transmits the difference information omitting information relating to the sensor node A100 to the business application server 300. The base transceiver station B200 can therefore reduce the data amount transmitted to the business application server 300.

The invention can be applied to a sensor network system comprising numerous sensor nodes. In particular, it is suitable for application to a sensor network system used for shop floor control of a product, or the physical distribution management of a product.

What is claimed is:

1. A computer system comprising:
a wireless terminal which transmits information,
a business application server which performs a predetermined operation based on information received from said wireless terminal, and
a base transceiver station which relays communications between said wireless terminal and said business application server, wherein:
said base transceiver station, to manage plural wireless terminals in groups, stores a group definition table showing a correspondence between said wireless terminal and said groups;
stores the information received from said terminals in a state history table which manages the state history of said wireless terminals;
extracts difference information between the information received from said wireless terminals and the information stored in said state history table; and
summarizes said extracted difference information for each group, and transmits it to the business application server.

2. The computer system according to claim 1, wherein said extracted difference information is a difference relating to the presence of wireless terminals belonging to said groups.

3. The computer system according to claim 1, wherein:
said wireless terminal comprises a sensor which measures a physical quantity, and
said extracted difference information is a difference relating to the physical quantity measured by said wireless terminal.

4. The computer system according to claim 1, wherein said base transceiver station manages wireless terminals relating to a task in the group.

5. The computer system according to claim 1, wherein if plural base transceiver stations receive information from the same wireless terminal within a predetermined time, said base transceiver stations request retransmission of information by said wireless terminal.

6. The computer system according to claim 1, wherein when transmission of information is requested by said base transceiver station:
said wireless terminal stores an identifier of said base transceiver station, and
transmits information including the identifier of the base transceiver station which requested transmission of information on the immediately preceding occasion; and
said base transceiver station determines whether or not it was the last to receive information from this wireless terminal based on the identifier of the base transceiver station in the information received from said wireless terminal.

7. A base transceiver station which relays communications between wireless terminals which transmit information and a business application server which performs predetermined operations based on information received from said wireless terminals, wherein:
said base transceiver station, to manage said plural wireless terminals in groups, stores a group definition table showing a correspondence between said wireless terminals and said groups;
stores the information received from said terminals in a state history table which manages the state history of said wireless terminals;
extracts difference information between the information received from said wireless terminals and the information stored in said state history table;
summarizes said extracted difference information for each group; and
transmits it to the business application server.

8. The base transceiver station according to claim 7, wherein said extracted difference information is a difference relating to the presence of wireless terminals in said groups.

9. The base transceiver station according to claim 7, wherein said extracted difference information is a difference relating to a physical quantity measured by said wireless terminals.

10. The base transceiver station according to claim 7, wherein said base transceiver station manages wireless terminals relating to a task in the group.

11. The base transceiver station according to claim 7, wherein when plural base transceiver stations receive information from the same wireless terminal within a predetermined time, they request retransmission of the information by said wireless terminal.

* * * * *